United States Patent
Sheridan

(10) Patent No.: US 10,298,819 B2
(45) Date of Patent: May 21, 2019

(54) CAMERA APPARATUS AND METHODS WHICH ALLOW FOR FILTERS TO BE USED

(71) Applicant: NextVR Inc., Newport Beach, CA (US)

(72) Inventor: Ryan Michael Sheridan, Rancho Cucamonga, CA (US)

(73) Assignee: NextVR Inc., Newport Beach, CA (US)

( * ) Notice: Subject to any disclaimer, the term of this patent is extended or adjusted under 35 U.S.C. 154(b) by 187 days.

(21) Appl. No.: 15/331,738

(22) Filed: Oct. 21, 2016

(65) Prior Publication Data

US 2018/0024419 A1 Jan. 25, 2018

Related U.S. Application Data

(60) Provisional application No. 62/364,838, filed on Jul. 20, 2016, provisional application No. 62/365,361, (Continued)

(51) Int. Cl.
*G03B 17/12* (2006.01)
*H04N 13/02* (2006.01)
(Continued)

(52) U.S. Cl.
CPC .......... *H04N 5/2253* (2013.01); *G03B 17/12* (2013.01); *H04N 5/2254* (2013.01);
(Continued)

(58) Field of Classification Search
CPC ...... G03B 17/12; G03B 17/566; G03B 11/00; G03B 35/08; H04N 2213/001;
(Continued)

(56) References Cited

U.S. PATENT DOCUMENTS 5,883,695 A 3/1999 Paul
6,141,034 A 10/2000 McCutchen
(Continued)

OTHER PUBLICATIONS

Notification of Transmittal of the Interntion Search Report and the Written Opinion of the International Searching Authority, or the Declaration and the International Search Report with the Written Opinion of the International Searching Authority from International Application No. PCT/US 20171042681 dated Nov. 9, 2017, pp. 1-6.
(Continued)

*Primary Examiner* — Christopher S Kelley
*Assistant Examiner* — Matthew K Kwan
(74) *Attorney, Agent, or Firm* — Straub & Straub; Michael P. Straub; Stephen T. Straub

(57) ABSTRACT

A camera apparatus, e.g., a stereoscopic camera apparatus, includes a slideable filter plate inserted into a slot in a dual element mounting plate. The slideable filter plate includes a plurality of selectable pairs of filter mounting positions and changes between pairs of filter mounting positions may be performed without altering camera alignments. Each pair of filter mounting positions includes a right eye filter mounting position and a left eye filter mounting position. Each pair of filter mounting positions in the slideable filter plate includes a pair of filters or no filters.

12 Claims, 27 Drawing Sheets

Related U.S. Application Data filed on Jul. 21, 2016, provisional application No. 62/383,336, filed on Sep. 2, 2016.

(51) Int. Cl.
*H04N 5/225* (2006.01)
*H04N 13/239* (2018.01)
*G03B 11/00* (2006.01)
*G03B 35/08* (2006.01)
*G03B 17/56* (2006.01)

(52) U.S. Cl.
CPC ......... *H04N 5/2258* (2013.01); *H04N 13/239* (2018.05); *G03B 11/00* (2013.01); *G03B 17/566* (2013.01); *G03B 35/08* (2013.01); *H04N 2213/001* (2013.01)

(58) Field of Classification Search
CPC .. H04N 5/2253; H04N 5/2254; H04N 5/2258; H04N 13/239
USPC ........................................................... 348/47
See application file for complete search history.

(56) References Cited

U.S. PATENT DOCUMENTS

| | | |
|---|---|---|
| 8,451,320 B1 | 5/2013 | Cole et al. |
| 8,610,757 B2 | 12/2013 | Cole et al. |
| 9,204,127 B1 | 12/2015 | Cole et al. |
| 9,313,474 B1 | 4/2016 | Cole et al. |
| 9,407,902 B1 | 8/2016 | Cole et al. |
| 9,485,494 B1 | 11/2016 | Cole et al. |
| 9,538,160 B1 | 1/2017 | Cole |
| 9,699,437 B2 | 7/2017 | Cole et al. |
| 9,729,850 B2 | 8/2017 | Cole et al. |
| 9,821,920 B2 | 11/2017 | Cole et al. |
| 9,832,449 B2 | 11/2017 | Cole et al. |
| 9,832,450 B2 | 11/2017 | Cole et al. |
| 9,836,845 B2 | 12/2017 | Cole et al. |
| 9,865,055 B2 | 1/2018 | Cole et al. |
| 9,894,350 B2 | 2/2018 | Cole et al. |
| 2003/0202118 A1* | 10/2003 | Hirunuma ................ G02B 7/06 348/373 |
| 2004/0080666 A1 | 4/2004 | Kawano et al. |
| 2015/0341617 A1 | 11/2015 | Cole et al. |
| 2015/0346812 A1 | 12/2015 | Cole et al. |
| 2015/0346832 A1 | 12/2015 | Cole et al. |
| 2016/0065946 A1 | 3/2016 | Cole et al. |
| 2016/0065947 A1 | 3/2016 | Cole et al. |
| 2016/0080728 A1 | 3/2016 | Cole et al. |
| 2016/0212403 A1 | 7/2016 | Cole et al. |
| 2016/0212409 A1 | 7/2016 | Cole et al. |
| 2016/0219262 A1 | 7/2016 | Cole et al. |
| 2016/0219305 A1 | 7/2016 | Cole et al. |
| 2016/0227190 A1 | 8/2016 | Cole et al. |
| 2016/0239978 A1 | 8/2016 | Cole et al. |
| 2016/0241836 A1 | 8/2016 | Cole et al. |
| 2016/0241837 A1 | 8/2016 | Cole et al. |
| 2016/0241838 A1 | 8/2016 | Cole et al. |
| 2016/0241892 A1 | 8/2016 | Cole et al. |
| 2016/0253795 A1 | 9/2016 | Cole et al. |
| 2016/0253809 A1 | 9/2016 | Cole et al. |
| 2016/0253810 A1 | 9/2016 | Cole et al. |
| 2016/0253839 A1 | 9/2016 | Cole et al. |
| 2016/0255326 A1 | 9/2016 | Cole et al. |
| 2016/0255327 A1 | 9/2016 | Cole et al. |
| 2016/0269716 A1 | 9/2016 | Cole et al. |
| 2016/0360180 A1 | 12/2016 | Cole et al. |
| 2016/0373734 A1 | 12/2016 | Cole et al. |
| 2017/0050743 A1 | 2/2017 | Cole et al. |
| 2017/0061600 A1 | 3/2017 | Cole et al. |
| 2017/0094247 A1 | 3/2017 | Cole et al. |
| 2017/0150122 A1 | 5/2017 | Cole |
| 2017/0324945 A1 | 11/2017 | Cole et al. |
| 2017/0359564 A1 | 12/2017 | Cole et al. |
| 2018/0020206 A1 | 1/2018 | Sheridan |
| 2018/0027152 A1 | 1/2018 | Sheridan |

OTHER PUBLICATIONS

Notification of Transmittal of the International Search Report and the Written Opinion of the International Searching Authority, or the Declaration with the International Search Report and the Written Opinion of the International Searching Authority from International Application No. PCT/US 2017/042678 dated Nov. 9, 2017, pp. 1-6.

\* cited by examiner

CAMERA APPARATUS AND METHODS WHICH ALLOW FOR FILTERS TO BE USED

RELATED APPLICATIONS

The present application claims the benefit of U.S. Provisional Patent Application Ser. No. 62/364,838 filed Jul. 20, 2016, U.S. Provisional Patent Application Ser. No. 62/365,361 filed Jul. 21, 2016, and U.S. Provisional Patent Application Ser. No. 62/383,336 filed Sep. 2, 2016, each of which is hereby expressly incorporated by reference in its entirety.

FIELD

The present application relates to camera apparatus and methods and, more particularly, to methods and apparatus for mounting multiple cameras, e.g., one or more stereoscopic camera pairs, and/or camera accessories, e.g., filters.

BACKGROUND

As 3D movies and other programs have grown in popularity, there is a growing desire for camera hardware and apparatus which can support capture of images that are suitable for use in generating 3D content, e.g., videos that may be used as part of a movie, advertisement, program, or even for viewing of an event in real or near real time. One way of generating 3D content is by capturing stereoscopic image data, e.g., pairs of images which can be used as left and right eye images, using stereoscopic camera systems including a pair of left and right cameras for capturing left and right eye images.

In the case of stereoscopic image capture where pairs of cameras are used, e.g., to capture images corresponding to left and right eye views, alignment of the cameras in the camera pair, sometimes referred to as a stereoscopic camera pair, can be important. As part of the alignment the spacing and orientation between the cameras needs to be set as desired and maintained after configuration so that it is reasonably consistent for a period of time in which images, e.g., video images, are captured.

Unfortunately, with many existing camera mounting systems, which are designed primarily with mounting of single cameras in mind, relatively loose fitting lenses and/or limited adjustment capabilities can make aligning a pair of cameras and maintaining the alignment over time difficult.

When capture of stereoscopic images corresponding to a 360 degree area is desired, the complexity with camera alignment and positioning is greatly complicated since it is desirable that stereoscopic images be captured in a manner that allows them to be easily stitched together since a single camera normally can not capture a full 360 degree field of view.

During field deployment of stereoscopic camera systems the alignment of stereoscopic cameras of a stereoscopic camera pair may be disturbed by vibrations and/or shocks made during shipping.

It is often desirable to be able to use filters with cameras and/or selectively choose not to use a filter for certain shots. Changing of filters often involves removal of a lens or placing a filter over the lens. Such actions may affect the alignment of the lens and/or camera. In the case of stereoscopic camera pairs which have been aligned, changing or removing filters can be particularly problematic in that the alignment between the camera pairs maybe changed due to the manual removal of a lens or filter on a lens and/or placement of a new filter on a lens.

It is desirable that in at least some embodiments that a switching between using a filter or not, or, alternatively, switching between different filters, be easily implemented without having to individually place or remove a filter over one camera lens and then the other camera lens of a camera pair.

In view of the above discussion it should be appreciated that there is a need for improved methods and apparatus for using, changing and/or removing a filters in a system where multiple cameras are used.

SUMMARY

Camera related methods and apparatus which are well suited for supporting the use of filters are described. The methods and apparatus can be used to allow for filters to be easily changed or removed from the optical path of cameras mounted in pairs.

The camera pairs can be used to capture stereoscopic image data, e.g., pairs of left and right eye images, are described. Various features relate to a camera apparatus including one or more pairs of cameras used to capture left and right eye images. A camera pair mounted in accordance with the present invention may be used alone or in combination with one or more additional camera pairs, e.g., additional camera pairs, mounted on a camera rig. Filters can be easily removed or inserted in front of camera sensors by sliding a filter holder in some embodiments.

Various features of the present invention facilitate accurate alignment of camera elements of a stereoscopic camera pair for improved stereoscopic image capture operations.

An exemplary camera apparatus, e.g. a stereoscopic camera apparatus, in accordance with some embodiments, includes a dual element mounting plate to which first and second camera sensors are secured; a first individual lens mount, e.g., a first lens mounting plate or first lens collar assembly including a lens mounting plate; and a second individual lens mounting plate, e.g., a second lens mounting plate or second lens collar assembly including a lens mounting plate. The dual element mounting plate supports first and second sensor holders which are secured to the dual element mounting plate, e.g., by screws. In some embodiments the first sensor holder is a first camera body that includes a first sensor mount, e.g., a mount for a first printed circuit board on which the first sensor is mounted, and a first processor which receives and processes the output of the first sensor to generate an image. In other embodiments the first sensor holder is a first sensor mount, e.g., a mount for a printed circuit board on which the first sensor is mounted, which is secured to the dual element mounting plate. In some cases where the first sensor holder is the first sensor mount, the first sensor is connected by a cable to a remote camera body which includes a first processor for processing pixel values captured by the first sensor to generate an output image.

In some embodiments the second sensor holder is a second camera body that includes a second sensor mount, e.g., a mount for a second printed circuit board on which the second sensor is mounted, and a second processor which receives and processes the output of the second sensor to generate an image. In other embodiments the second sensor holder is a second sensor mount, e.g., a mount for a printed circuit board on which the second sensor is mounted, which is secured to the dual element mounting plate. In some cases where the second sensor holder is the second sensor mount, the second sensor is connected by a cable to a remote camera body which includes a second processor for processing pixel values captured by the second sensor to generate an output image.

Thus, while the first and second sensors of the first and second cameras, respectively, are secured to the dual element mounting plate and held in place, the processor of a camera may be located adjacent or co-located with the sensor in the case where the sensor holder is the camera body or the processor of the camera may be located remotely as in the case where the sensor holder is a sensor mount secured to the dual element mounting plate but with the camera body and camera processor being mounted remotely. The remote position of the camera body allows for the spacing between the lenses of the first and second cameras to be configured without having to allow for space for the camera body used to house the processor of the camera.

In some embodiments, a single remote camera body includes both the first and second processors. In some embodiments, a single remote camera body includes a single processor which is coupled to both the first and second sensors, the single processor replacing the first and second processors.

An exemplary camera apparatus, e.g. a stereoscopic camera apparatus, in accordance with some embodiments, includes a stereoscopic camera pair including a left eye camera device and a right eye camera device, a dual element mounting plate, a pair of individual lens mounts, e.g., a pair of individual lens mounting plates or a pair of individual lens mounting collar assemblies each including a lens mounting plate, and a corresponding pair of left and right eye lenses. In some embodiments the left and right eye camera devices, sometimes referred to as cameras, each include a camera body in which a sensor is mounted, said camera body also housing a processor and one or more interfaces through which captured images can be output, e.g. to a display and/or control device. In some other embodiments the left and right eye camera devices, sometimes referred to as cameras, each include: a sensor mount in which a sensor is mounted, a remote camera body including a processor and one or more interfaces through which captured images can be output, e.g. to a display and/or control device, and a cable coupling the sensor to the processor in the remote camera body.

The sensor holders, e.g., camera bodies or sensor mounts, of a pair of individual camera devices of a stereoscopic camera pair including a first camera device and a second camera device are secured to a dual element mounting plate. A pair of individual lens mounts, e.g. individual lens mounting plates or individual lens mounting collar assemblies, are secured to the dual element mounting plate. The position of the sensor holder of the first camera device and the position of the sensor holder of the second camera device can be adjusted on the dual element mounting plate to allow the sensor holders to be spaced apart at the desired spacing, e.g., to achieve a desired spacing between the optical axis of each of the camera devices. A first camera lens can be inserted through a hole in the first lens mount. A second camera lens can be inserted through a hole in the second lens mount. In some but not necessarily all embodiments the lenses in the first and second individual lens mounts can be secured in position by the use of one or more set screws. The position of the individual lens mounts, e.g. individual lens mounting plates or mounting collar assemblies, and lenses secured thereto, can be adjusted relative to the dual element mounting plate and thus the lenses can be adjusted relative to the sensor holders mounted to the dual element mounting plate, each sensor holder including a sensor. Thus, by adjusting an individual lens mount, the alignment between the optical axis of the lens secured in the mount and the optical sensor in the corresponding sensor holder can be adjusted. Adjustments can be made to the tilt and position of the individual lens mounting mounts as needed to achieve a desired orientation.

In some embodiments a slot for a slideable filter plate is included in the dual element mounting plate to which the sensor holders of a stereoscopic camera pair may be, and sometimes are, mounted. The slideable filter plate includes multiple filter mounting positions. A filter may be mounted in a filter mounting position or the filter mounting position may be left open, e.g., no filter installed. By sliding the slideable filter plate, a selected pair of filters to be used at a give time can be changed or a switch may be made between using a pair of filters to capture images to capturing images without the use of filters. The slideable filter plate allows filters, e.g., filters mounted in the slideable filter plate, to be changed without having to alter or move camera lenses or sensor holders, thereby allowing camera alignment between cameras of a stereoscopic camera pair to be maintained even when filters are changed. The slideable filter plate is optional and not used in all embodiments.

An exemplary camera apparatus, in accordance with various embodiments, includes: a dual element mounting plate including a slot; and a slideable filter plate, including a plurality of pairs of filter mounting positions, said slideable filter plate inserted in the slot in the dual element mounting plate. In some such embodiments, a pair of filter mounting positions in the slideable filter plate includes a pair of filters or no filters. The slideable filter plate can be, and sometimes is, repositioned to align a selected pair of filter mounting positions with a pair of camera lenses, e.g., corresponding to a stereoscopic camera pair. Changes between filter pairs or between a filter pair and no filters are implemented without altering the alignment between the lenses and the image sensors.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 1:
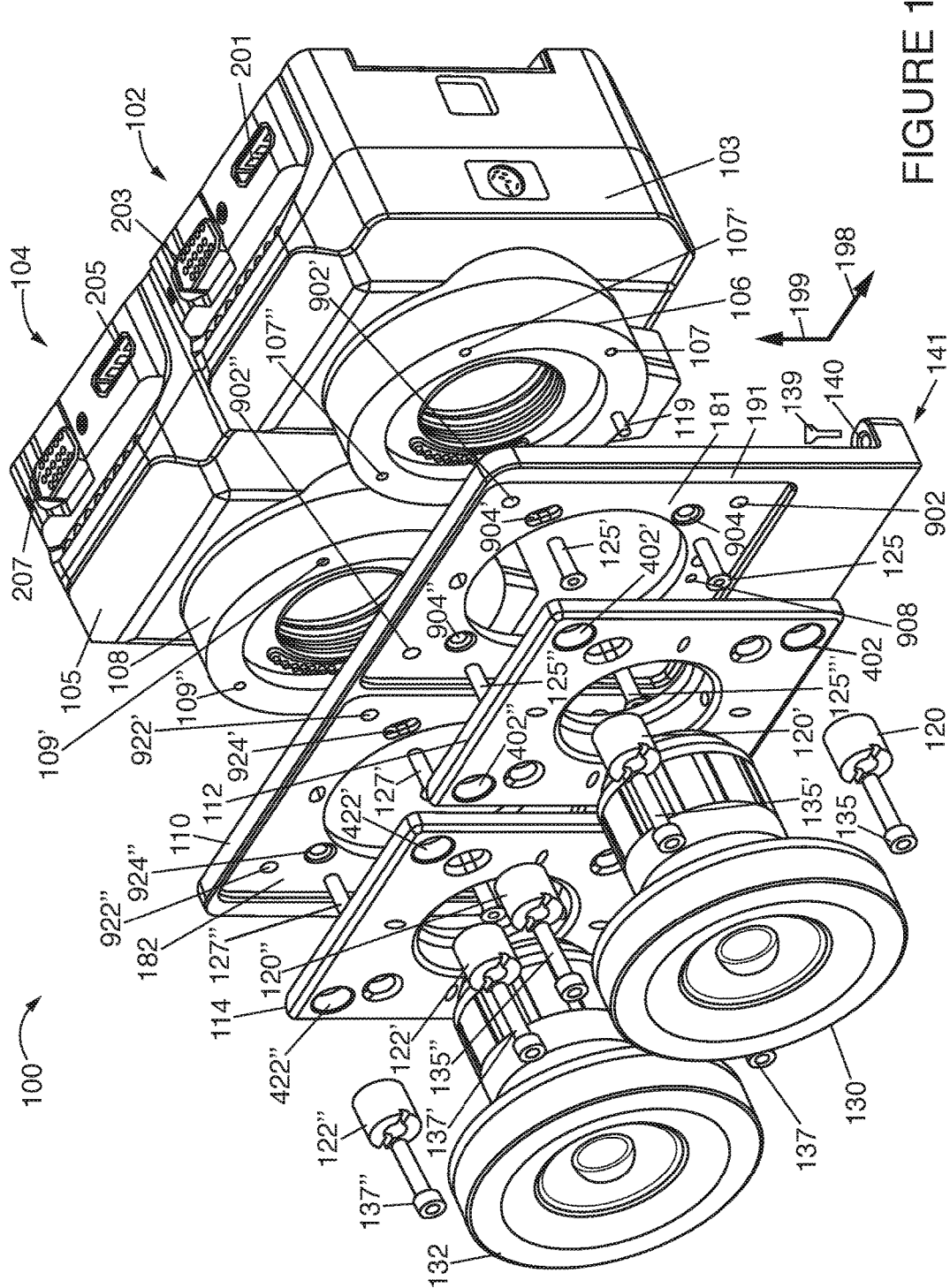
FIG. 1 illustrates an exemplary camera apparatus, e.g., a stereoscopic camera apparatus including a pair of camera devices, in accordance with an exemplary embodiment.

FIG. 1 illustrates an exemplary stereoscopic camera apparatus 100, in accordance with one exemplary embodiment. The exemplary camera apparatus 100 includes a stereoscopic camera pair including a left eye camera device 102 and a right eye camera device 104, a dual element mounting plate 110 to which first and second camera sensors are secured, a pair of left and right eye camera lens assemblies 130, 132, a pair of individual lens mounting plates 112, 114, and a plurality of adjustment bushings (120, 120', 120", 120''', 122, 122', 122", 122''') or which adjustments bushings (120, 120', 120", 122' and 122") are visible. The lens assemblies 130, 132 include wide angle lenses, e.g., fisheye lenses 302, 304 (see FIGS. 2 and 3).

The left eye camera device 102 and the right eye camera device 104 each comprise an outer camera body or shell (103, 105), respectively, and a portion of the outer camera body or shell (103, 105) includes a lens housing, e.g., a lens collar (106, 108), respectively. For example camera device 102 includes camera body 103, and a portion of the camera body 103 is lens collar 106, Camera device 104 includes camera body 105, and a portion of camera body 105 is lens collar 108 The lens assembly 130 can be inserted into the lens collar 106 and secured to the single lens mounting plate 112 via set screws which extend through the single lens mounting plate 112 and press against the side of the lens assembly 130 as will be discussed further below. The lens assembly 132 can be inserted into the lens collar 108 and secured to the single lens mounting plate 114 via set screws which extend through the single lens mounting plate 114 and press against the side of the lens assembly 132 when assembled as will be discussed further below.

While not visible in FIG. 1, each of the left eye camera device 102 and a right eye camera device 104 includes an image sensor (3208, 3228) which is mounted inside the camera body (103, 105), respectively, onto which light may be directed by the lens assembly 130, 132, respectively. (See FIG. 13.) Camera body 103 is a first sensor holder in which the first sensor 3208 is mounted, and camera body 105 is a second sensor holder in which the second sensor 3228 is mounted. Camera body 103 is secured to a first portion 1101 of the dual element mounting plate 110, and camera body 105 is secured to a second portion 1103 of the dual element mounting plate 110. See FIG. 11, which shows the camera body side of the dual element mounting plate which includes a first portion 1101, e.g., a mounting ring, on the rear side of the dual element mounting plate 110 to which the camera body 103 is secured, and a second portion 1103, e.g., a mounting ring on the rear side of the dual element mounting plate 110 to which the camera body 105 is secured.

Camera body 103 includes interface connectors 201 and 203, which are located on the top of the camera body 103; and camera body 105 includes interface connectors 205 and 207, which are located on the top of the camera body 105. Camera control signaling and/or signals communicating captured images corresponding to camera device 102 are communicated over interface connectors 201 and/or 203. Camera control signaling and/or signals communicating captured images corresponding to camera device 104 are communicated over interface connectors 205 and/or 207.

The exemplary dual element mounting plate 110 facilitates accurate mounting of the camera device bodies 103, 105 at a desired spacing with respect to each other to obtain a desired spacing between optical axis and also to facilitate mounting of the stereoscopic camera pair in a predictable manner relative to a support plate, e.g., support plate 1500 (see FIG. 15) of a camera rig to which the dual element mounting plate 110 can be secured via screws placed through holes in mounting flanges, e.g., via a screw 139 placed through hole 140 of mounting flange 141 of the dual element mounting plate 110. Additional screws not visible in FIG. 1, e.g., corresponding to additional flange holes in the dual element mounting plate 110 may further secure the dual element mounting plate 110 to the support plate, e.g., support plate 1500.

Screws 125, 125', 125", 125''', sometimes referred to a sensor holder mounting screws, extend through elongated slots 904, 904', 904", 904''' in the dual element mounting plate 110 and extend into threaded holes 107, 107', 107", 107''' of lens collar 106 of camera device body 103 of camera device 102. The screws 125, 125', 125", 125''' secure the camera device body 103 to the dual element mounting plate 110 while still allowing for adjustments in the position of the camera device body 103 since the screws can move, when loose, within the slots as the camera device body 103 is moved. The elongated slots (904, 904' 904", 904''') are tapered allowing tapered heads of the sensor holding mounting screws (125, 125', 125", 125''') to be flush or recessed below a surface of the dual element mounting plate 110 through which the sensor holder mounting screws (125, 125', 125", 125''') extend. The lens collar 106 includes an alignment pin 119 which extends into an alignment hole 908 in the dual element mounting plate 110. Alignment hole 908 is for receiving camera alignment pin 119.

Screws 127, 127', 127", 127''' extend through elongated slots 924, 924', 924", 924''' in the dual element mounting plate 110 and extend into threaded holes 109, 109', 109", 109''' of lens collar 108 of camera body 105 of camera device 104. The screws 127, 127', 127", 127''' secure the camera body 105 of camera device 104 to the dual element mounting plate 110 while still allowing for adjustments in the position of the camera device body 105 of camera device 104 since the screws 127, 127', 127", 127''' can move, when loose, within the slots 924, 924', 924", 924''' as the camera body 105 of camera device 104 is moved. The elongated slots (924, 924', 924", 924''') are tapered allowing tapered heads of the sensor holding mounting screws (127, 127', 127", 127''') to be flush or recessed below a surface of the dual element mounting plate 110 through which the sensor holder mounting screws (127, 127', 127", 127''') extend. The lens collar 108 includes an alignment pin 121 (see FIG. 13) which extends into an alignment hole 928 (see FIG. 6) in the dual element mounting plate 110. Alignment hole 928 is for receiving camera alignment pin 121.

Figure 4:
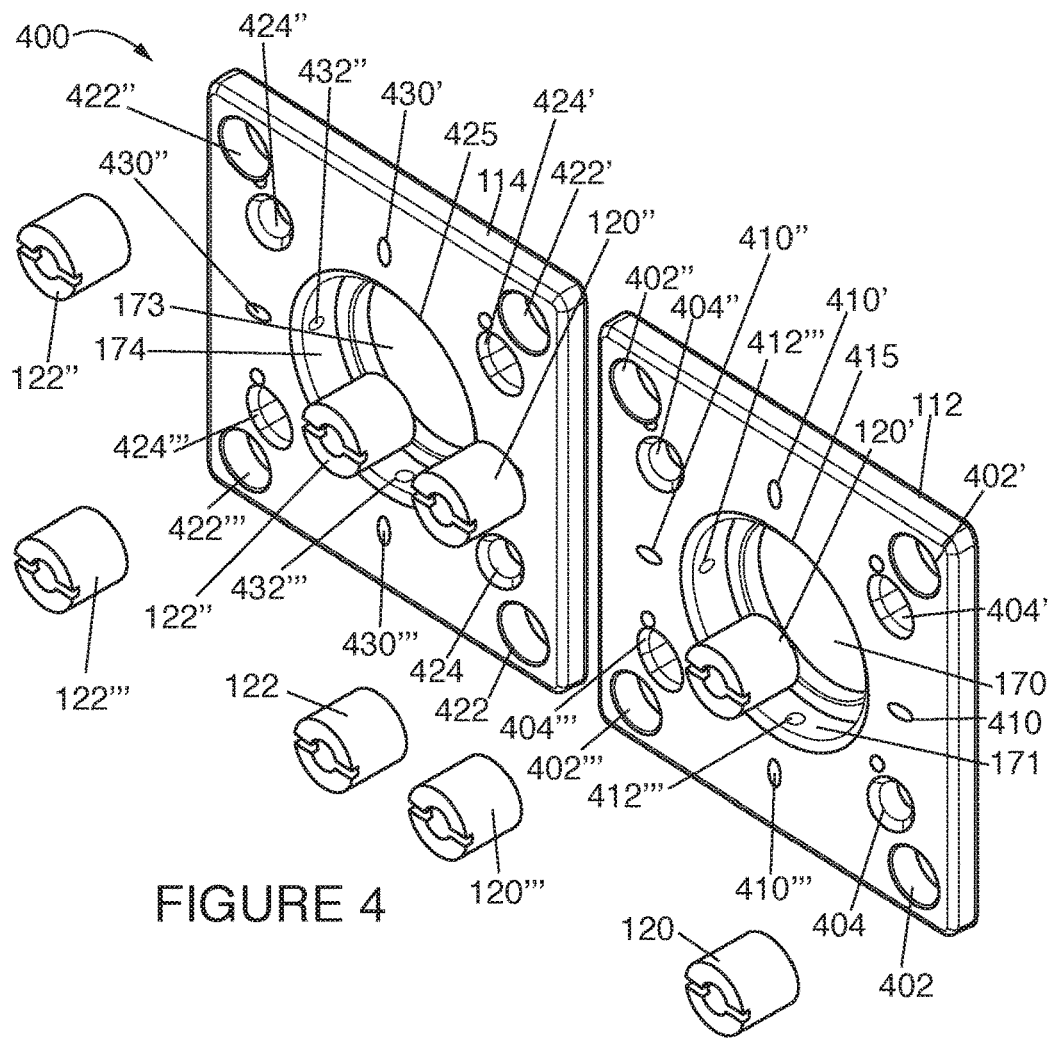
FIG. 4 illustrates an exemplary lens mounting plate pair used in the exemplary camera apparatus of FIG. 1 in greater detail.

The individual lens mounting plate 112 is secured by screws 135, 135', 135", 135''' which extend through threaded spacer bushings 120, 120', 120", 120''' into threaded holes (902, 902', 902", 902'''), respectively of the dual element mounting plate 110. Threaded spacer bushings 120, 120', 120", 120''' are inserted into threaded holes 402, 402', 402" and 402''', respectively. The threaded holes (402, 402', 402", 402''') are in each corner of the individual lens mount 112. Threaded spacer bushing (120, 120', 120", 120''') are inserted into the individual lens mount 112 for controlling spacing between corners of individual lens mount 112 and a surface of the dual element mounting plate 110. The spacer bushings (120, 120', 120", 120''') are threaded bushing having threads on the outside of the spacer bushings. Depending on how far each threaded spacer bushing is screwed in, the spacing maintained by the bushing between the individual lens mounting plate 112 and the dual element mounting plate 110 can be adjusted. The lens assembly 130 is inserted into the center hole 170 of the individual lens mounting plate 112 with the sidewall 171 of the hole 170 (see FIG. 4) serving as a lens assembly mounting collar. Referring briefly to FIG. 4 it can be seen that threaded angled slots or holes 410, 410', 410" and 410" extend at an angle through the single lens mounting plate 112. Screws, e.g., small cap screws, are inserted into the threaded angled holes 410, 410', 410" and 410''' and extend out of the openings 412, 412', 412", 412''' to press against the sidewall of the lens assembly 130 inserted into the hole 170 thereby securing the lens assembly 130 in place to the single lens mounting plate 112. By adjusting the depth of the threaded spacer bushings 120, 120', 120", 120''' the spacing between each corner of the individual lens mounting plate 112 and the dual element mounting plate 110 can be adjusted. Screws 135, 135', 135" and 135''' are used to secure the spacer bushings 120, 120', 120", 120''' and thus the individual lens mounting plate 112 to the dual element mounting plate 110. As the spacing between the corners of the individual lens mounting plate 112 and dual element mounting plate 110 are adjusted, the orientation of the lens assembly 130 relative to the camera body 103 of the camera device 102 will change along with the position of the lens assembly 130 relative to the sensor 3208 mounted in the camera body 103 of the camera device 102. Thus by adjusting the threaded spacer bushings 120, 120', 120", 120''', the alignment of the lens assembly 130 to the sensor 3228 mounted in camera body 103 in the camera device 102 can be adjusted with a fine degree of accuracy.

Individual lens mounting plate 114 is secured to the dual mounting plate 110 in the same or similar way single lens mounting plate 112 is secured to the dual mounting plate 110.

The individual lens mounting plate 114 is secured by screws 137, 137', 137", 137''' which extend through threaded spacer bushing 122, 122', 122", 122''', respectively, into threaded holes (922, 922', 922", 922'''), respectively, of the dual element mounting plate 110. Threaded spacer bushings 122, 122', 122", 122''' are inserted into threaded holes 422, 422', 422" and 422''', respectively. The threaded holes (422, 422', 422", 422''') are in each corner of the individual lens mount 114. Threaded spacer bushing (122, 122', 122", 122''') are inserted into the individual lens mount 114 for controlling spacing between corners of individual lens mount 114 and a surface of the dual element mounting plate 110. The spacer bushings (122, 122', 122", 122''') are threaded bushings having threads on the outside of the spacer bushings. Depending on how far each threaded spacer bushing 122, 122', 122", 122''' is screwed in, the spacing maintained by the bushing between the individual lens mounting plate 114 and the dual element mounting plate 110 can be adjusted. The lens assembly 132 is inserted into the center hole 173 of the individual lens mounting plate 114 with the sidewall 174 of the hole 173 serving as a lens assembly mounting collar.

By adjusting the depth of the threaded spacer bushings 122, 122', 122", 122''' the spacing between each corner of the individual lens mounting plate 114 and the dual element mounting plate 110 can be adjusted. Screws 137, 137', 137" and 137''' are used to secure the spacer bushings 122, 122', 122", 122''' and thus the individual lens mounting plate 114 to the dual element mounting plate 110. As the spacing between the corners of the individual lens mounting plate 114 and dual element mounting plate 110 are adjusted, the orientation of the lens assembly 132 relative to the camera body 105 of the camera device 104 will change along with the position of the lens assembly 132 relative to the sensor 3228 mounted in the camera body 105 of the camera device 104. Thus by adjusting the threaded spacer bushings 122, 122', 122", 122''', the alignment of the lens assembly 132 to the sensor 3228 in the camera body 105 of camera device 104 can be adjusted with a fine degree of accuracy.

The use of screws to hold the components together reduces the risk that the components will shift during shipping or use.

Arrow 198 indicates a first reference direction and arrow 199 indicates a second reference direction. Dual element mounting plate 110 includes a first flat recessed surface 181 corresponding to individual lens mount 112. Dual element mounting plate 110 includes a second flat recessed surface 182 corresponding to individual lens mount 114. The first and second flat recessed surfaces (181, 182) are surrounded by a lip 191 which at least partially protects the first individual lens mount 112 and the second individual lens mount 114 from side impacts when the first and second individual lens mounts (112, 114) are secured to the dual element mounting plate 110. The first and second individual lens mounts (112, 114) are square or generally square in shape and are smaller in first and second directions (198, 199) than the first and second recesses (181, 182) of the dual element mounting plate 110 into which the first and second individual lens mounts (112, 114) are inserted and secured, respectively.

Figure 2:
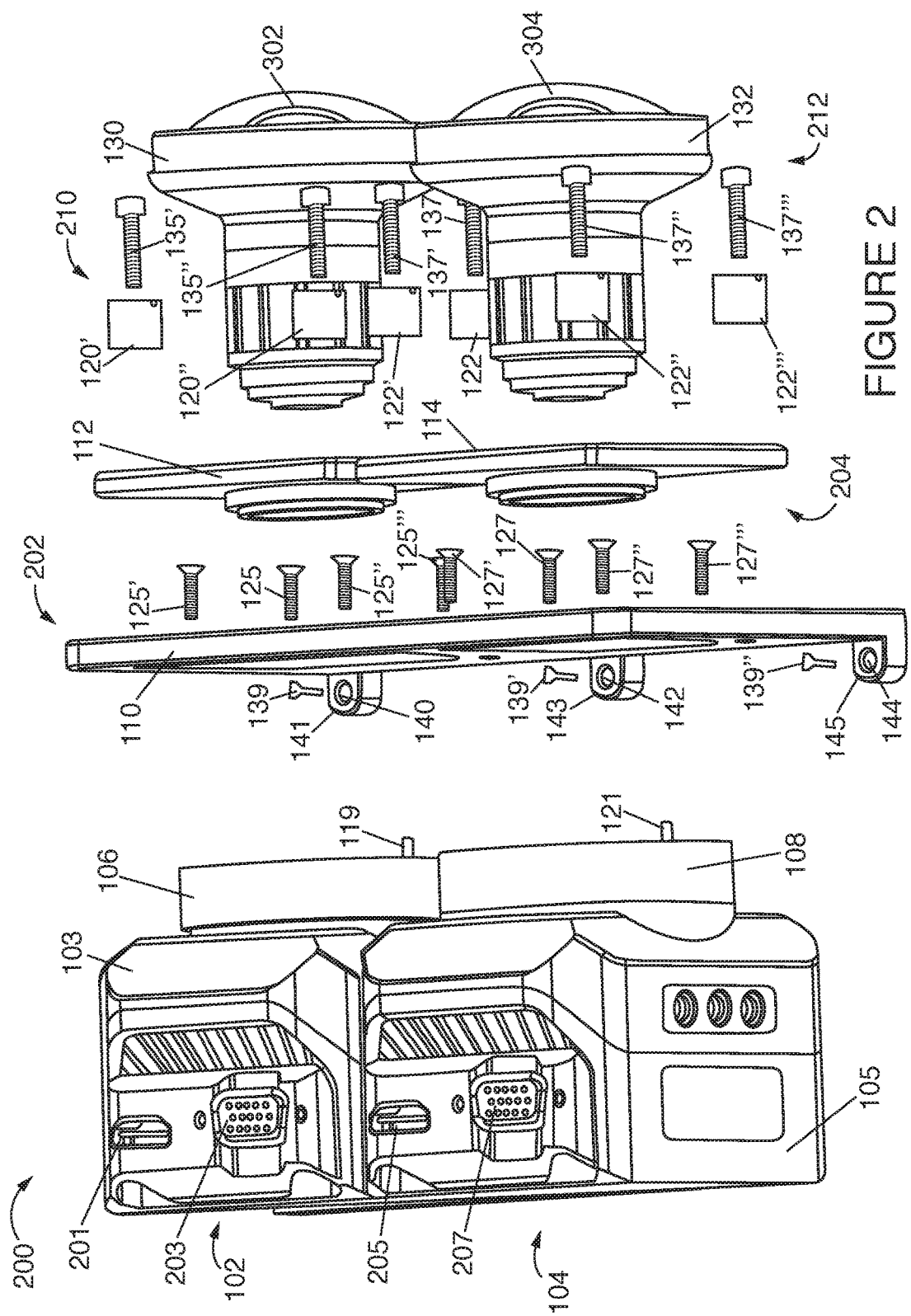
FIG. 2 illustrates a top perspective view of the exemplary camera apparatus of FIG. 1 in which various features and elements can be seen with more clarity and greater detail.

FIG. 2 includes drawings 200, 202, 204, 210 and 212, illustrating a top perspective exploded view of the exemplary camera apparatus 100 of FIG. 1 in which various features and elements can be seen with more clarity and greater detail. Drawing 200 illustrates left eye camera device 102 including camera body 103 including lens collar 106. Camera body 103 includes interface connectors 201, 203. Drawing 200 further illustrates alignment pin 119 included in lens collar 106. Alignment pin 119 extends into an alignment hole 908 in the dual element mounting plate 110. (See FIG. 9.) Drawing 200 further illustrates right eye camera device 104 including camera body 105 including lens collar 108. Camera body 105 includes interface connectors 205, 207. Drawing 200 further illustrates an alignment pin 121 included in lens collar 108. Alignment pin 121 extends into an alignment hole 928 in the dual element mounting plate 110. (See FIG. 9.)

Drawing 202 illustrates dual element mounting plate 110 including mounting flanges 141, 143, 145 and corresponding holes 140, 142, 144, through which a screw (139, 139', 139"), respectively, may be used to secure the dual element mounting plate 110 to support plate 1500. (See FIG. 15.) Drawing 202 further illustrates screws (125, 125', 125", 125''') which are used to secure the dual element mounting plate 110 to the camera body 103 via threaded screw holes (107, 107', 107", 107''') in collar 106. Drawing 202 further illustrates screws (127, 127', 127", 127''') which are used to secure the dual element mounting plate 110 to the camera body 105 via threaded screw holes (109, 109', 109", 109''') in collar 108.

Drawing 204 illustrates individual lens mounting plate 112 and individual lens mounting plate 114. Drawing 210 illustrates two of the four externally threaded alignment bushings (120', 120") which screw into threaded holes (402', 402") in individual lens mounting plate 112 and which are used to set, e.g., adjust, the spacing between the individual lens mounting plate 112 and the dual element mounting plate 110. Drawing 204 further illustrates screws (135', 135") which go through holes in spacer bushings (120' 120"), respectively, and which are used to secure the individual lens mounting plate 112 to the dual element mounting plate 110. Drawing 210 further illustrates the four externally threaded alignment bushings (122, 122', 122", 122''') which screw into threaded holes (422, 422', 422", 422''') in individual lens mounting plate 114 and which are used to set, e.g., adjust, the spacing between the individual lens mounting plate 114 and the dual element mounting plate 110. Drawing 204 further illustrates screws (137, 137', 137", 137''') which go through holes in spacer bushings (122, 122', 122", 122''', respectively, and which are used to secure the individual lens mounting plate 114 to the dual element mounting plate 110.

Drawing 212 illustrates the left eye camera lens assembly 130 including fish eyes lens 302. Lens assembly 130 is inserted through the individual lens mounting plate 112 and through the dual element mounting plate 110 and into the collar 106. Lens assembly 130 is secured, e.g., locked in place, to the individual lens mounting plate 112. Drawing 212 further illustrates the right eye camera lens assembly 132 including fish eyes lens 304. Lens assembly 132 is inserted through the individual lens mounting plate 114 and through the dual element mounting plate 110 and into the collar 108. Lens assembly 132 is secured, e.g., locked in place, to the individual lens mounting plate 114.

Figure 3:
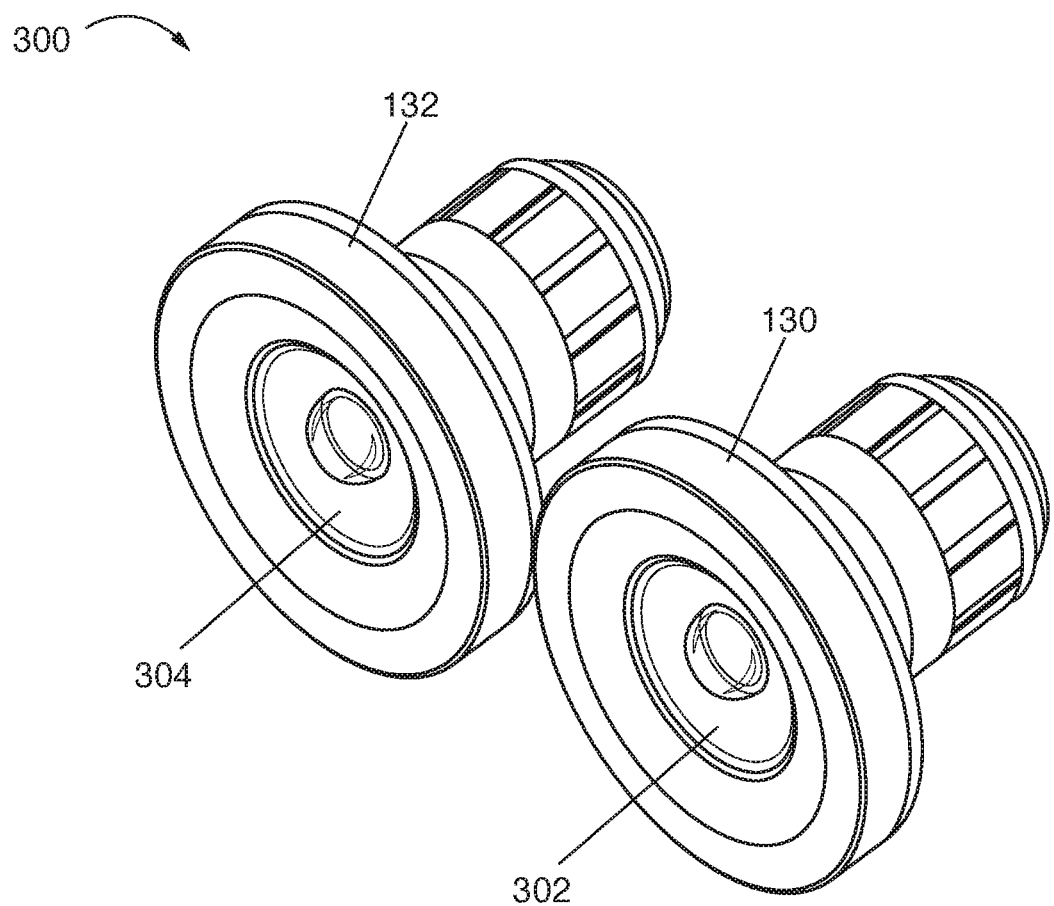
FIG. 3 illustrates a lens assembly pair including a left eye camera lens assembly and a right eye camera lens assembly used in the exemplary camera apparatus of FIG. 1.

FIG. 3 is a drawing 300 illustrating the lens assemblies of the camera apparatus 100 including the left eye camera lens assembly 130 and the right eye camera lens assembly 132. The lens assemblies 130, 132 form the optical portion of the camera apparatus 100. In some embodiments each of the lens assemblies 130, 132 includes one or more lenses. In some embodiments the lens assembly 130 includes a fish eye lens 302 while the lens assembly 132 includes a fish eye lens 304.

FIG. 4 is a drawing 400 illustrates an exemplary individual lens mounting plate pair (112, 114) used in the exemplary camera apparatus 100 in greater detail shown along with a plurality of adjustment bushings. The lens mounting plate pair includes a left lens mounting plate 112 and a right lens mounting plate 114. Once the lens assemblies (130, 132) are mounted to their respective mounting plates 112, 114, the assembly of lens and mounting plates can be adjusted and/or aligned relative to the dual element mounting plate 110, which is an intermediate mounting plate. Each of the individual lens mounting plates 112, 114 have unique adjustment slots and use a design that keeps their lens assemblies properly secured and allows for adjustments and alignments to be performed in a relatively simple manner. In some embodiments each of the lens mounting plates 112, 114 is a rectangular plate with rounded edges. Other customized shapes of lens mounting plates are possible and may be used. The left lens mounting plate 112 includes four tapped holes 402, 402', 402" and 402'" in four respective corners of the plate 112 through which four corresponding adjustment bushings 120, 120', 120" and 120'" are inserted and screwed in. The right lens mounting plate 114 includes four tapped holes 422, 422', 422" and 422'" in four respective corners of the plate 114 through which four corresponding adjustment bushings 122, 122', 122" and 122'" are inserted and screwed in. The adjustment bushings (120, 120', 120", 120'") have external threads, and the amount to which an adjustment bushing is screwed in is used to control the spacing between a corner of individual lens mounting plate 112 and the dual element mounting plate 110. The adjustment bushings (122, 122', 122", 122'") have external threads, and the depth to which an adjustment bushing is screwed is used to control the spacing between a corner of individual lens mounting plate 114 and the dual element mounting plate 110.

Center hole 170 of the individual lens mounting plate 112 is visible; lens assembly 130 (see FIG. 3) is inserted through center hole 170 of individual lens mounting plate 112. The sidewall 171 of the hole 170 serves as a lens assembly mounting collar. Threaded angled slots or holes 410, 410', 410" and 410" extend at an angle through the single lens mounting plate 112. Screws, e.g., small cap screws or set screws, are inserted into the threaded angled holes 410, 410', 410" and 410'" and extend out of the openings 412, 412', 412", 412'", respectively, to press against the sidewall of the lens assembly 130 inserted into the hole 170 thereby securing the lens assembly 130 in place to the single lens mounting plate 112.

Center hole 173 of the individual lens mounting plate 114 is visible; lens assembly 132 (see FIG. 3) is inserted through center hole 173 of individual lens mounting plate 114. The sidewall 174 of the hole 173 serves as a lens assembly mounting collar. Threaded angled slots or holes 430, 430', 430" and 430" extend at an angle through the single lens mounting plate 114. Screws, e.g., small cap screws or set screws, are inserted into the threaded angled holes 430, 430', 430" and 430'" and extend out of the openings 432, 432', 432", 432'", respectively, to press against the sidewall of the lens assembly 132 inserted into the hole 173 thereby securing the lens assembly 132 in place to the single lens mounting plate 114.

Slotted holes access holes (404, 404', 404", 404'") in single lens mounting plate 112 correspond to slotted holes (904, 904', 904", 904'") in dual element mounting plate 110. Slotted holes access holes (404, 404', 404", 404'") in single lens mounting plate 112 allow access to screws (125, 125', 125", 125'"), respectively, which are used to secure the dual element mounting plate 110 to camera body 103, via screw holes (107, 107', 107", 107'"), respectively, in collar 106. (See FIG. 1.) Slotted holes access holes (424, 424', 424", 424'") in single lens mounting plate 114 correspond to slotted holes (924, 924', 924", 924'") in dual element mounting plate 110. Slotted holes access holes (424, 424', 424", 424'") in single lens mounting plate 114 allow access to screws (127, 127', 127", 127'"), respectively, which are used to secure the dual element mounting plate 110 to camera body 105, via screw holes (109, 109', 109", 109'"), respectively, in collar 108.

Individual lens mounting plate 112 includes an outer lip or rim 415 upon which the lens assembly 130 is seated when the lens assembly 130 is inserted through hole 170. Individual lens mounting plate 114 includes an outer lip or rim 425 upon which the lens assembly 132 is seated when the lens assembly 132 is inserted into hole 173.

Figure 5:
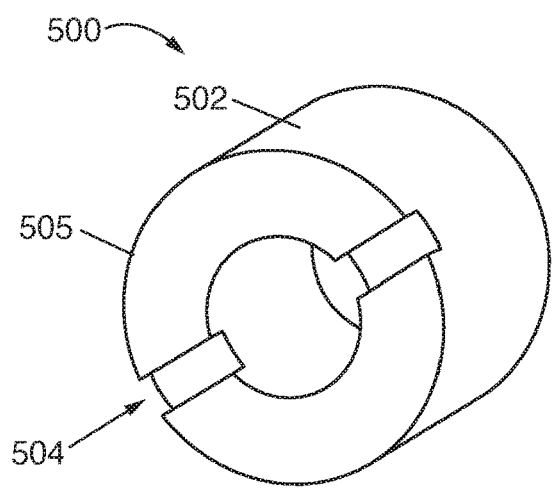
FIG. 5 illustrates an exemplary mount adjustment bushing used in the exemplary camera system of FIG. 1 in greater detail.

FIG. 5 illustrates an exemplary mount adjustment bushing 500 that may be used as any one of the bushings (120, 120', 120", 120'", 122, 122', 122", 122'") in the exemplary camera apparatus 100 of FIG. 1. Exemplary mount adjustment bushing 500 has threads on the outside portion 502. Exemplary bushing 502 has a slot 504 to allow for a screwdriver to turn the bushing into a threaded hole, e.g. threaded hole 402, in plate 112, e.g., to achieve a desired adjustment spacing between the corner of the individual lens mounting plate, e.g., plate 112, and the dual element mounting plate 110. Exemplary spacer bushing 500 is hollow in the center. Exemplary spacer bushings (120, 120', 120", 120'") are hollow in the center allowing a retaining screw (135, 135', 135", 135'") to pass through the spacer bushing (120, 120', 120", 120'") and into a threaded hole (902, 902', 902", 902'"), respectively, in the dual element mounting plate 110. Similarly, exemplary spacer bushings (122, 122', 122", 122'") are hollow in the center allowing a retaining screw (137, 137', 137", 137'") to pass through the spacer bushing (122, 122', 122", 122'") and into a threaded hole (922, 922', 922", 922'"), respectively, in the dual element mounting plate 110.

Exemplary spacer bushing 500 shows a screwdriver slot 504 in the head 505 of the bushing 500 into which a drive tool can be inserted and rotated to drive the bushing in or out of the threaded hole into which the bushing is inserted. Although a screwdriver slot is shown in exemplary bushing 500, in some embodiments a different type of recess and/or protrusion in the head of the spacer bushing is used into which a drive tool can be mated, e.g., inserted, and rotated to drive the bushing in or out of the threaded hole into which the bushing is inserted. In some embodiments, a standard recess or protrusion in the head of the spacer is used, e.g., a recess to accept a slotted screwdriver bit or an Allen key tool. In other embodiments, a unique custom recess or protrusion is used in the head of the spacer bushing, such that the spacer bushing can be moved in or out by those in possession of a corresponding custom drive tool, but cannot be easily repositioned by those who are not in possession of the custom drive tool.

Figure 6:
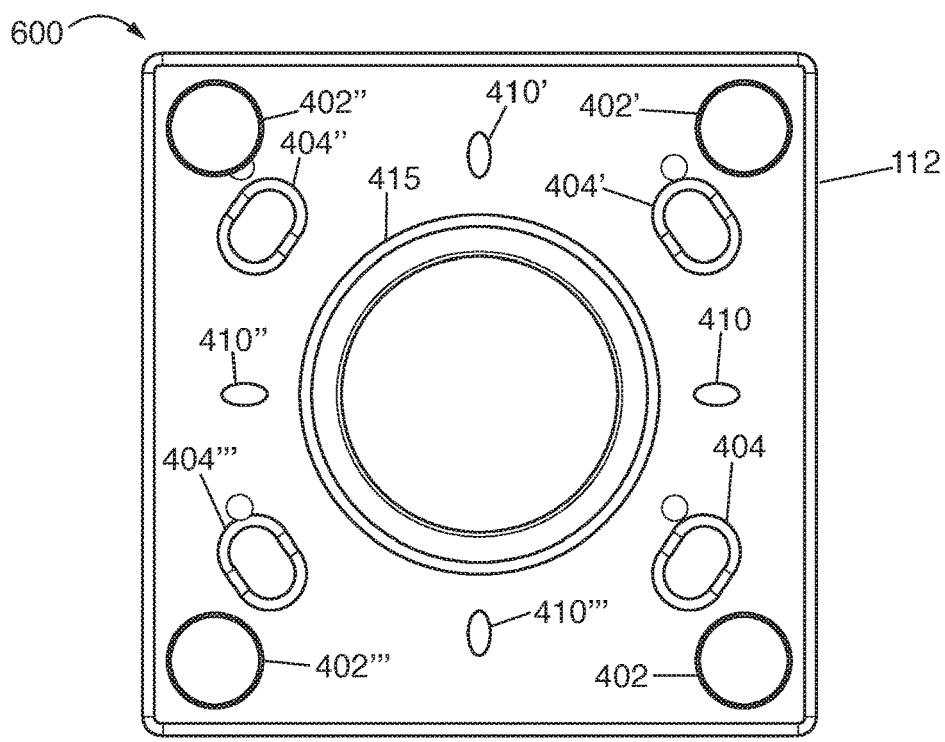
FIG. 6 illustrates a front view of an exemplary individual lens mounting plate.

Drawing 600 of FIG. 6 illustrates a front view of an exemplary lens mounting plate 112.

Figure 7:
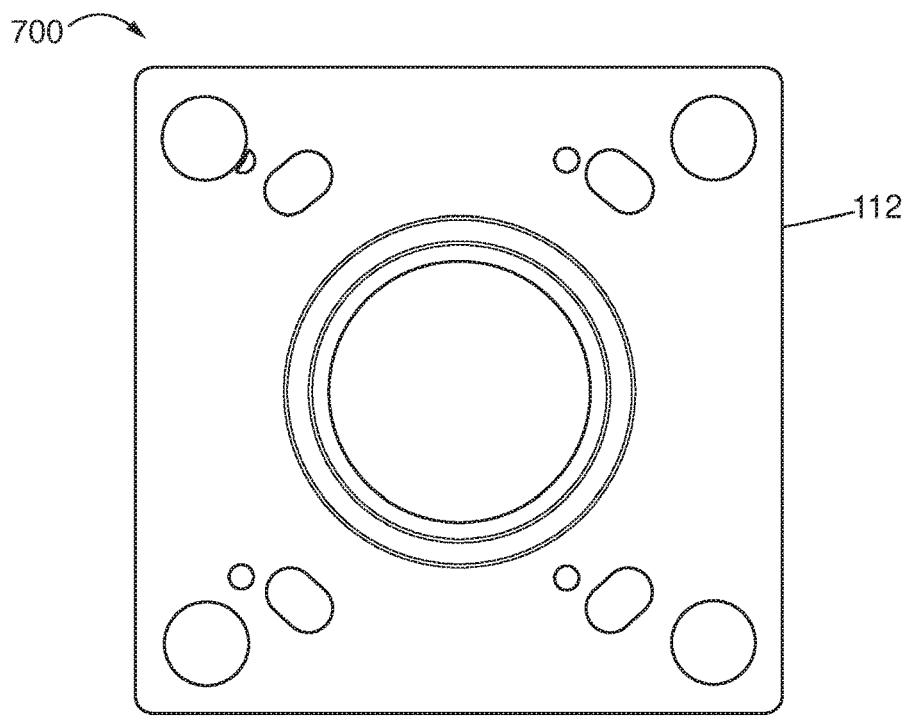
FIG. 7 illustrates a rear view of the exemplary individual lens mounting plate.

Drawing 700 of FIG. 7 illustrates a rear view of an exemplary lens mounting plate, e.g., exemplary lens mounting plate 112.

Figure 8:
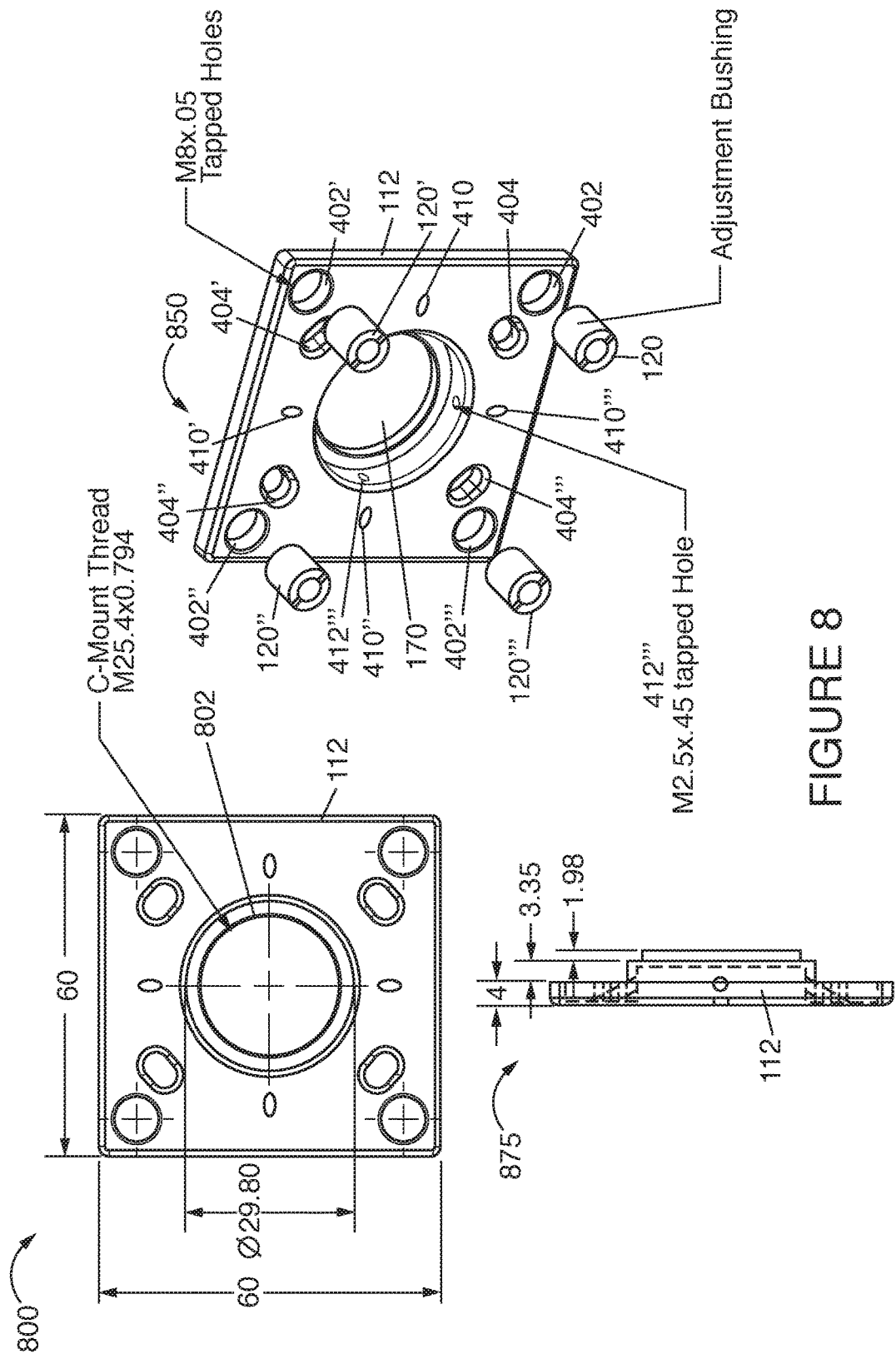
FIG. 8 illustrates multiple drawings which show various views and dimensional details of the exemplary individual lens mounting plate.

FIG. 8 illustrates multiple drawings (800, 850, 875) which show various views and dimensional details of the exemplary lens mounting plate 112. It should be appreciated that the dimensional details of lens mounting plate 114 are similar to or the same as those of lens mounting plate 112. In one exemplary embodiment, the threaded tapped holes (410, 410', 410", 410'") with corresponding exits (412, 412', 412", 412'") of lens mounting plate 112 are M2.5×0.45 tapped holes; and the threaded tapped holes (430, 430', 430", 430'") with corresponding exits (432, 432', 432", 432'") of lens mounting plate 114 are M2.5×0.45 tapped holes. In one exemplary embodiment, the tapped holes (402, 402', 402", 402'") of individual lens mounting plate 112 are M8×0.05 tapped holes; and the tapped holes (422, 422', 422", 422'") of individual lens mounting plate 112 are M8×0.05 tapped holes. In some such embodiments, the mounting adjustment bushing (120, 120', 120", 120''', 122, 122', 122", 122''') have external thread M8×0.05.

In one exemplary embodiment individual lens mounting plate 112 is substantially a 60 mm×60 mm square with rounded corners as shown in drawing 800. In some embodiments, the thickness of portions of individual lens mounting plate 112 are 4 mm, 3.35 mm, and 1.98 mm as shown in drawing 875.

In one exemplary embodiment, the individual lens mounting plate 112 includes a threaded portion 802, corresponding to hole 170, for screwing in the lens assembly 130. In one such embodiment, the threaded portion 802 has M25.4×0.794 C-mount threads. In one exemplary embodiment, the individual lens mounting plate 114 includes a threaded portion, corresponding to hole 173, for screwing in the lens assembly 132. In one such embodiment, the threaded portion, corresponding to hole 173 has M25.4×0.794 C-mount threads.

Figure 9:
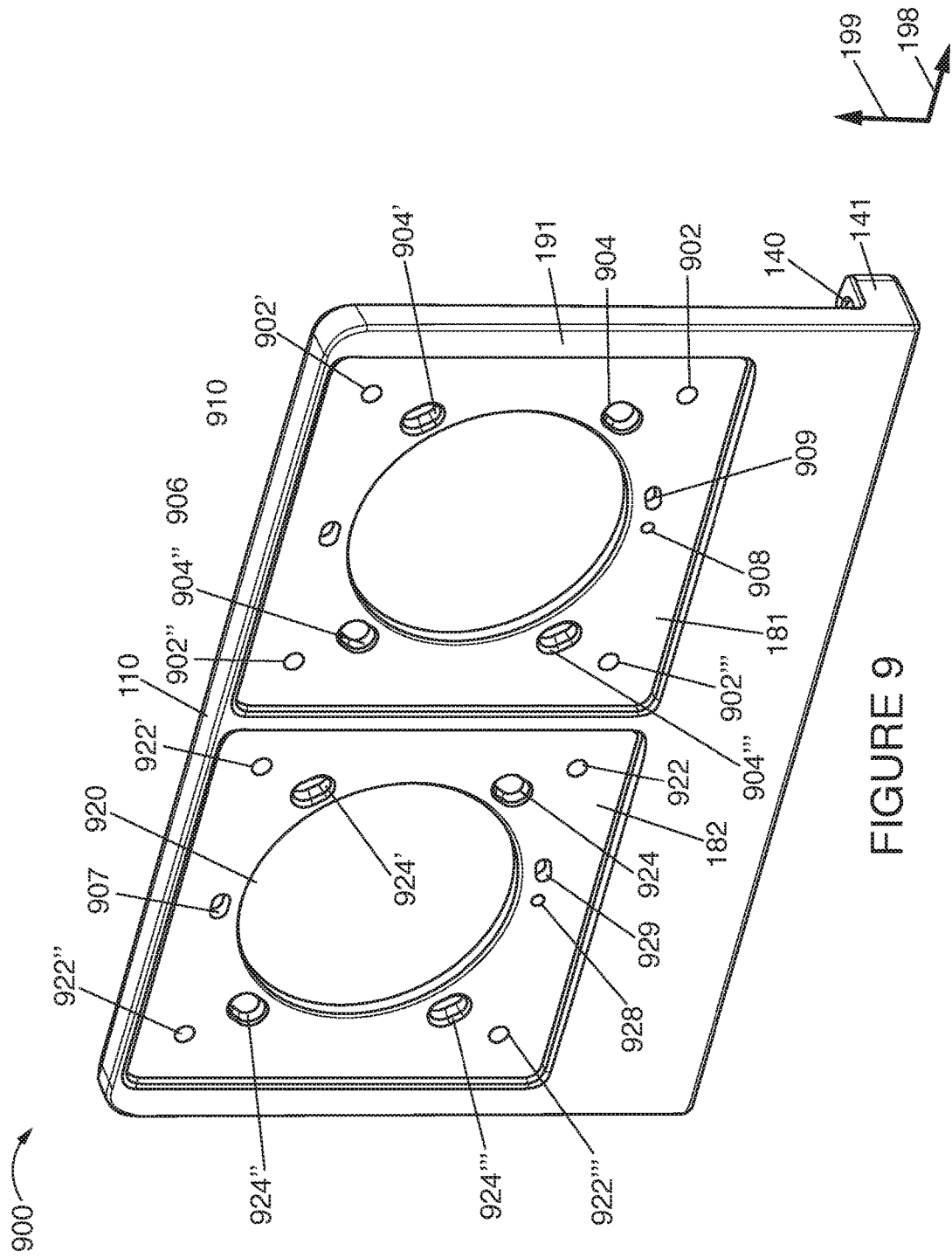
FIG. 9 illustrates a perspective front view of an exemplary dual element mounting plate, sometimes referred to as an intermediate mounting plate, used in the exemplary camera apparatus of FIG. 1 in greater detail.

Drawing 900 of FIG. 9 illustrates a perspective front view of an exemplary dual element mounting plate 110, used in the exemplary camera apparatus of FIG. 1 in greater detail. Dual element mounting plate 110 includes a first portion 901 and second portion 903. Lower mounting flange 141 is visible in FIG. 9. Lower mounting flange 141 includes hole 140 through which a screw 139 can be inserted to secure the dual element mounting plate 110 to a support plate, e.g., support plate 1500 of FIG. 15. In various embodiments, the hole 140 is slightly lager than the screw 139, allowing for adjustment when mounting the dual element mounting plate 110 to the support plate, e.g., support plate 1500. Four dual element mounting plates can be secured to support plate 1500.

Threaded screw holes (902, 902', 902", 902''') are for accepting screws (135, 135', 135", 135'''), respectively. Threaded screw holes (922, 922', 922", 922''') are for accepting screws (137, 137', 137", 137'''), respectively. Slotted holes (904, 904', 904", 904''') are pass through holes for screws (125, 125', 125", 125'''), which facilitate adjustment of alignment between the camera body 103 including an image sensor 150 and the dual element mounting plate 110. Slotted holes (924, 924', 924", 924''') are pass through holes for screws (127, 127', 127", 127'''), which facilitate adjustment of alignment between the camera body 105 including an image sensor 3228 and the dual element mounting plate 110. Hole 908 is for accepting alignment pin 119. Hole 928 is for accepting alignment pin 121.

Dual element mounting plate 110 includes a first flat recessed surface 181 corresponding to the first individual lens mount 112. Dual element mounting plate 110 includes a second flat recessed surface 182 corresponding to the second individual lens mount 114. The first and second flat recessed surfaces 181, 182 are surrounded by a lip 191 which at least partially protects the first individual lens mount 112 and second individual lens mount 114 or 1060 from side impacts when the first and second individual lens mounts are secured to the dual element mounting plate 110. The first and second individual lens mounts 112, 114 are square or generally square in shape and are smaller in first and second directions 198, 199 than the first and second recesses 181, 182 of said the dual element mounting plate 110 or 1100 into which the first and second individual lens mounts 112, 114 are inserted and secured, respectively.

Figure 10:
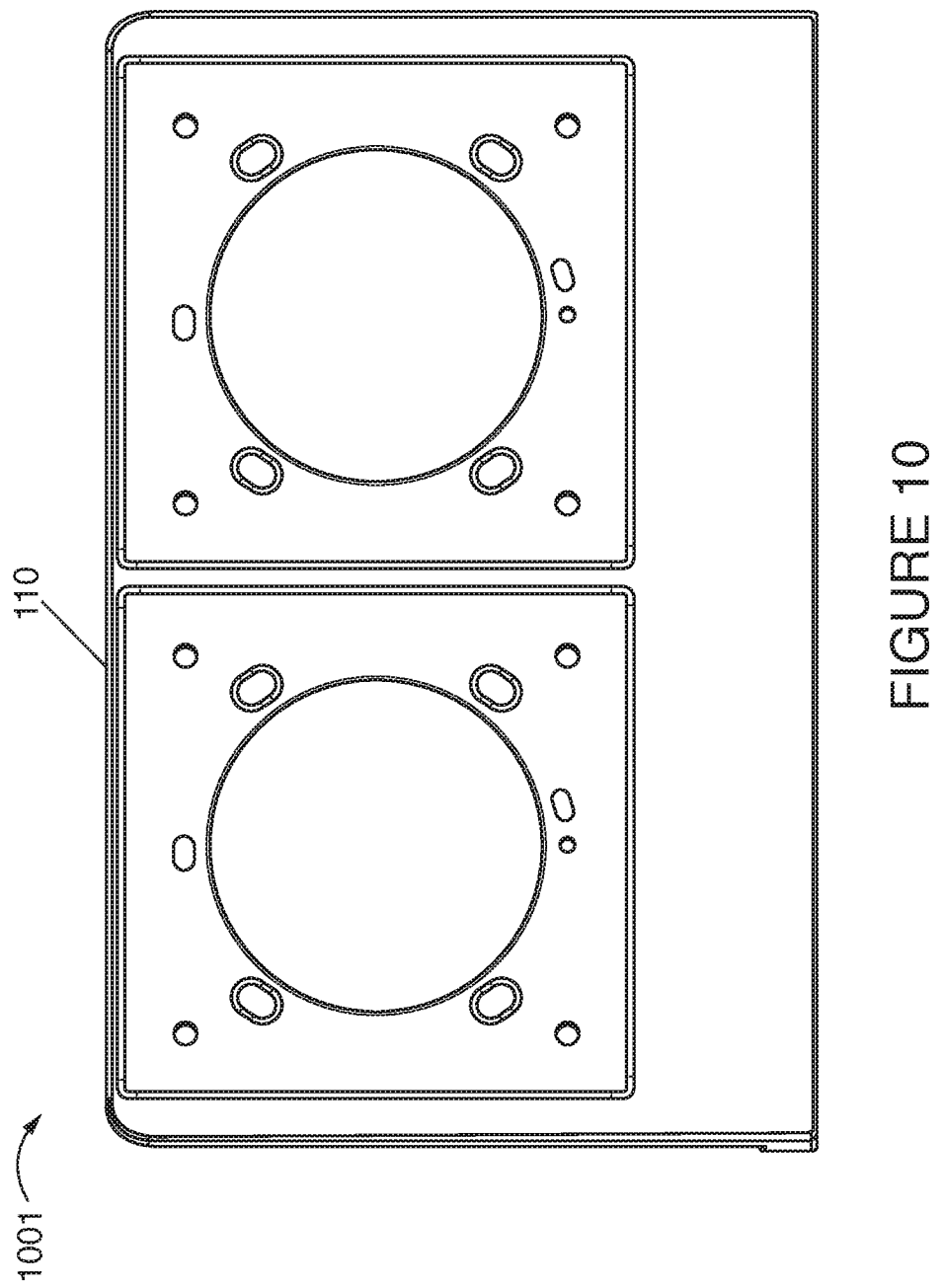
FIG. 10 illustrates a front view of the dual element mounting plate shown in FIG. 9 and various other figures.

Drawing 1001 of FIG. 10 illustrate is a front view, e.g., a lens mounting plate interface side view, of the dual element mounting plate 110 shown in FIG. 9 and various other figures.

Figure 11:
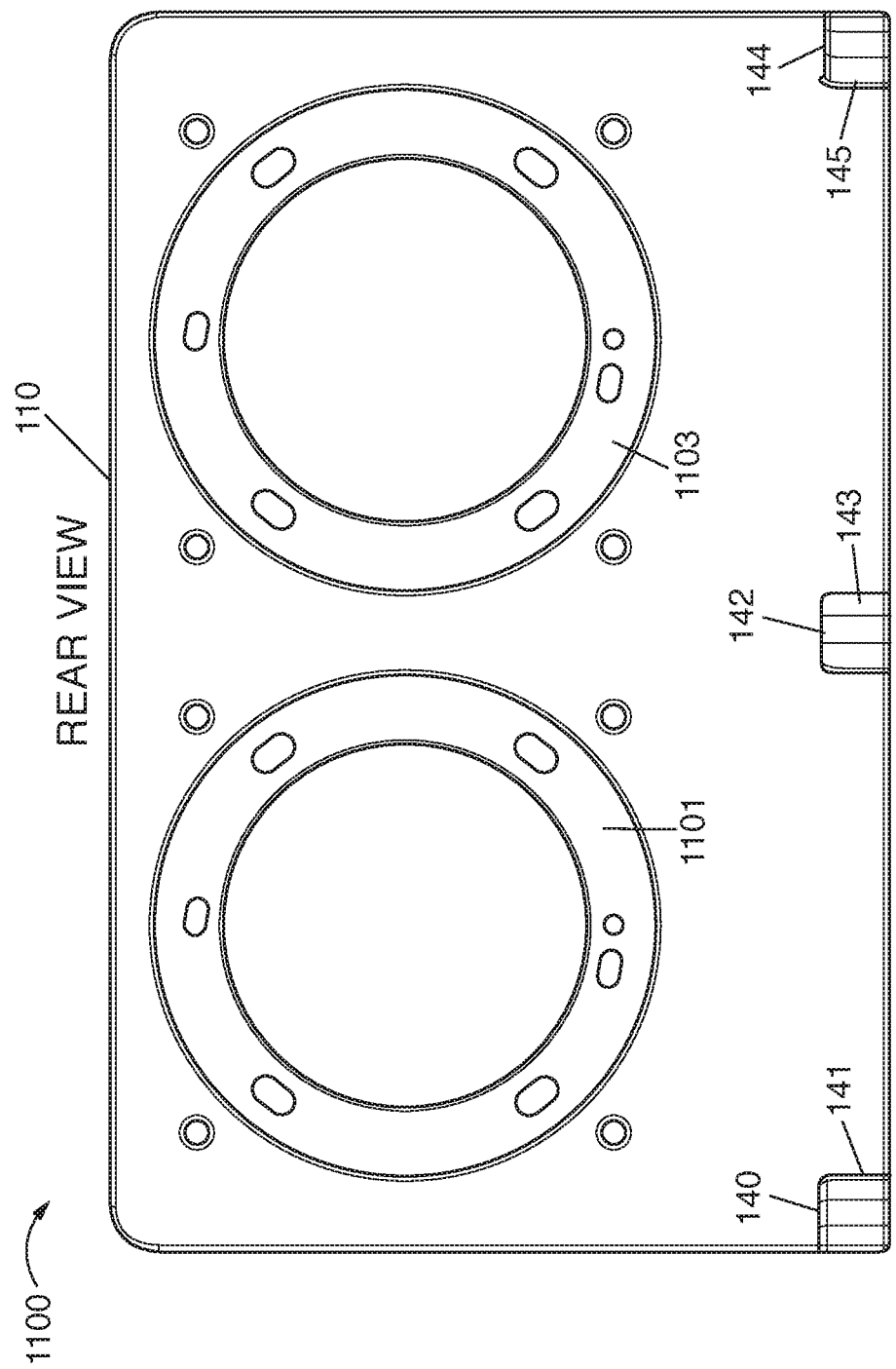
FIG. 11 illustrates a rear view of the exemplary dual element mounting plate.

Drawing 1100 of FIG. 11 illustrates a rear view of the exemplary dual element mounting plate 110, e.g., a camera body interface side view of the dual element mounting plate 110. FIG. 11 illustrates three lower flanges (141, 143, 145) and corresponding holes (140, 142, 144) via which screws (139, 139', 139") can be inserted to secure the dual element mounting plate 110 to a support plate, e.g. support plate 1500 of FIG. 15. Drawing 1100 also illustrates a first portion 1101, e.g., a first mounting ring, of dual element mounting plate 110, to which the first sensor holder, e.g., camera body 103, is secured. Lens collar 106 of camera body 103 interfaces with and is secured to first portion 1101 of the dual element mounting plate 110. Drawing 1100 also illustrates a second portion 1103, e.g., a second mounting ring, of dual element mounting plate 110, to which the first sensor holder, e.g., camera body 103, is secured. Lens collar 108 of camera body 105 interfaces with and is secured to second portion 1103 of the dual element mounting plate 110.

Figure 12:
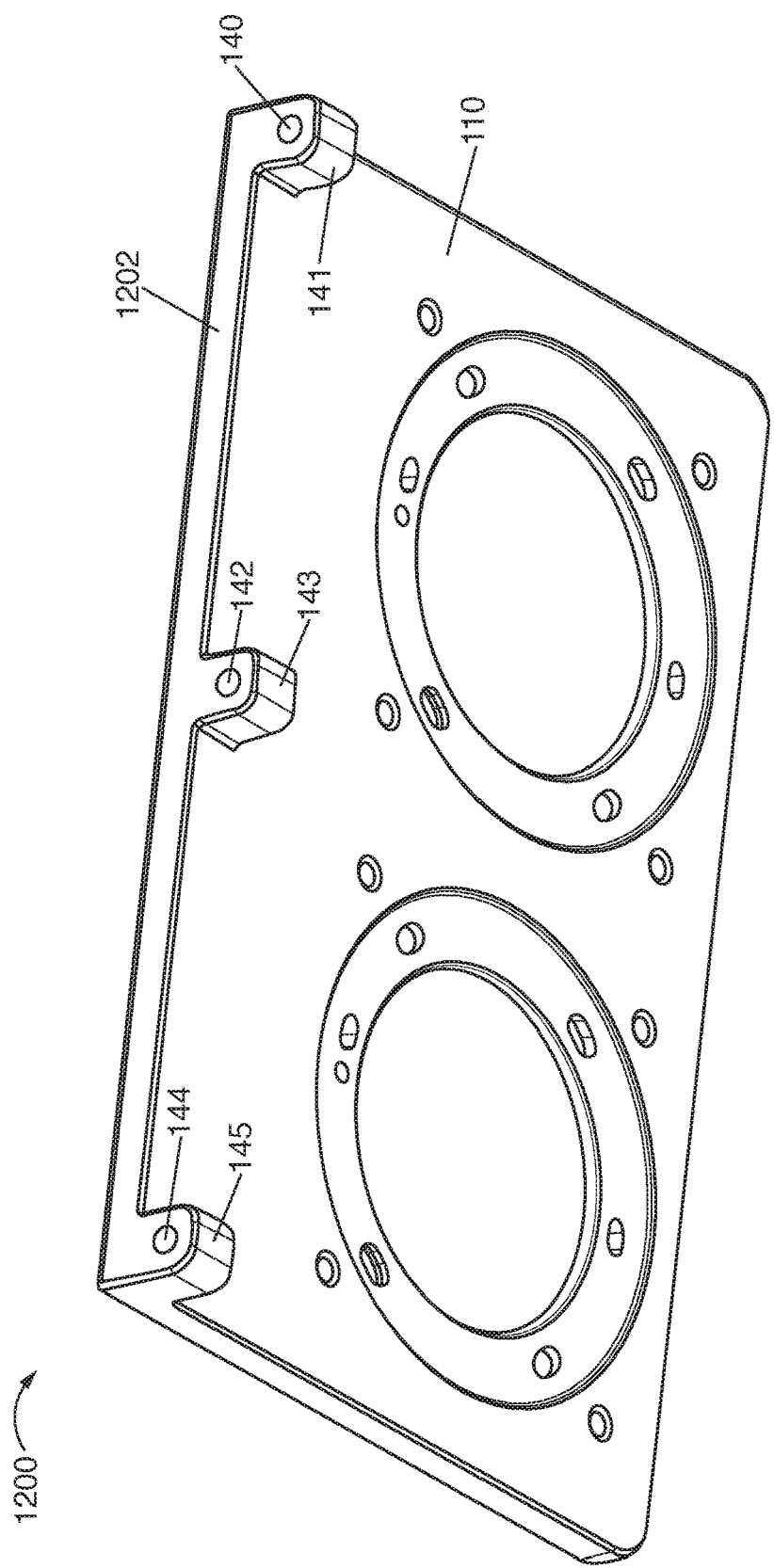
FIG. 12 is a perspective rear view of the exemplary dual element mounting plate when the mounting plate is in the inverted position, e.g., upside down.
Figure 15:
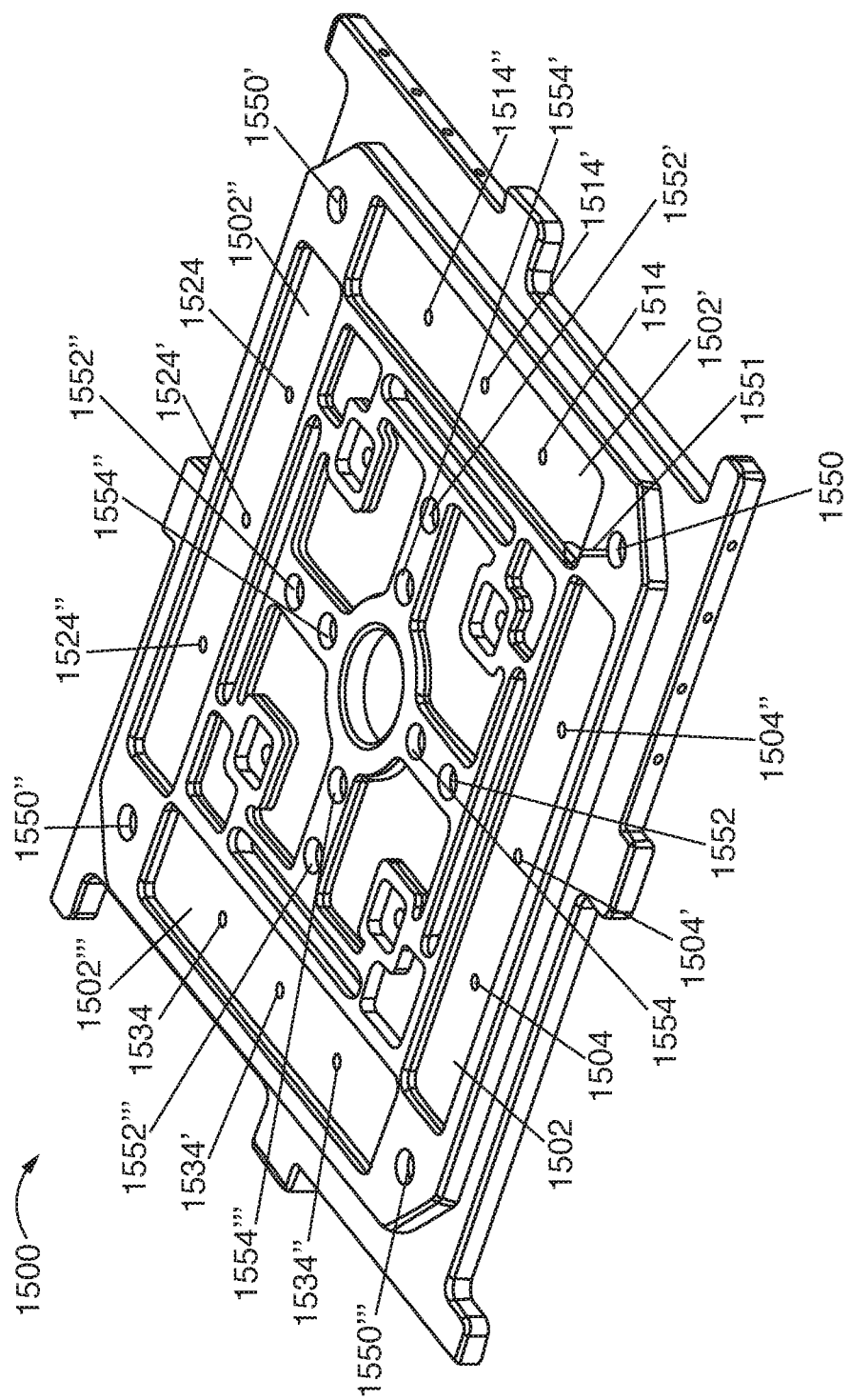
FIG. 15 shows a camera rig plate to which one or more mounted pairs of stereoscopic cameras can be secured to form a camera rig with multiple pairs of stereoscopic camera sensor holders mounted in different directions.

Drawing 1200 of FIG. 12 is a perspective rear view of the exemplary dual element mounting plate when the mounting plate is in the inverted position, e.g., upside down. In FIG. 11 the three lower flanges (141, 143, 145) and corresponding holes (140, 142, 144) via which screws can be inserted to secure the dual element mounting plate 110 to a support plate, e.g. support plate 1500 of FIG. 15, are visible. In FIG. 12, the base portion 1202 of the dual element mounting plate, which contacts the support plate, e.g. support plate 1500 of FIG. 15, when mounted, can be seen.

Figure 13:
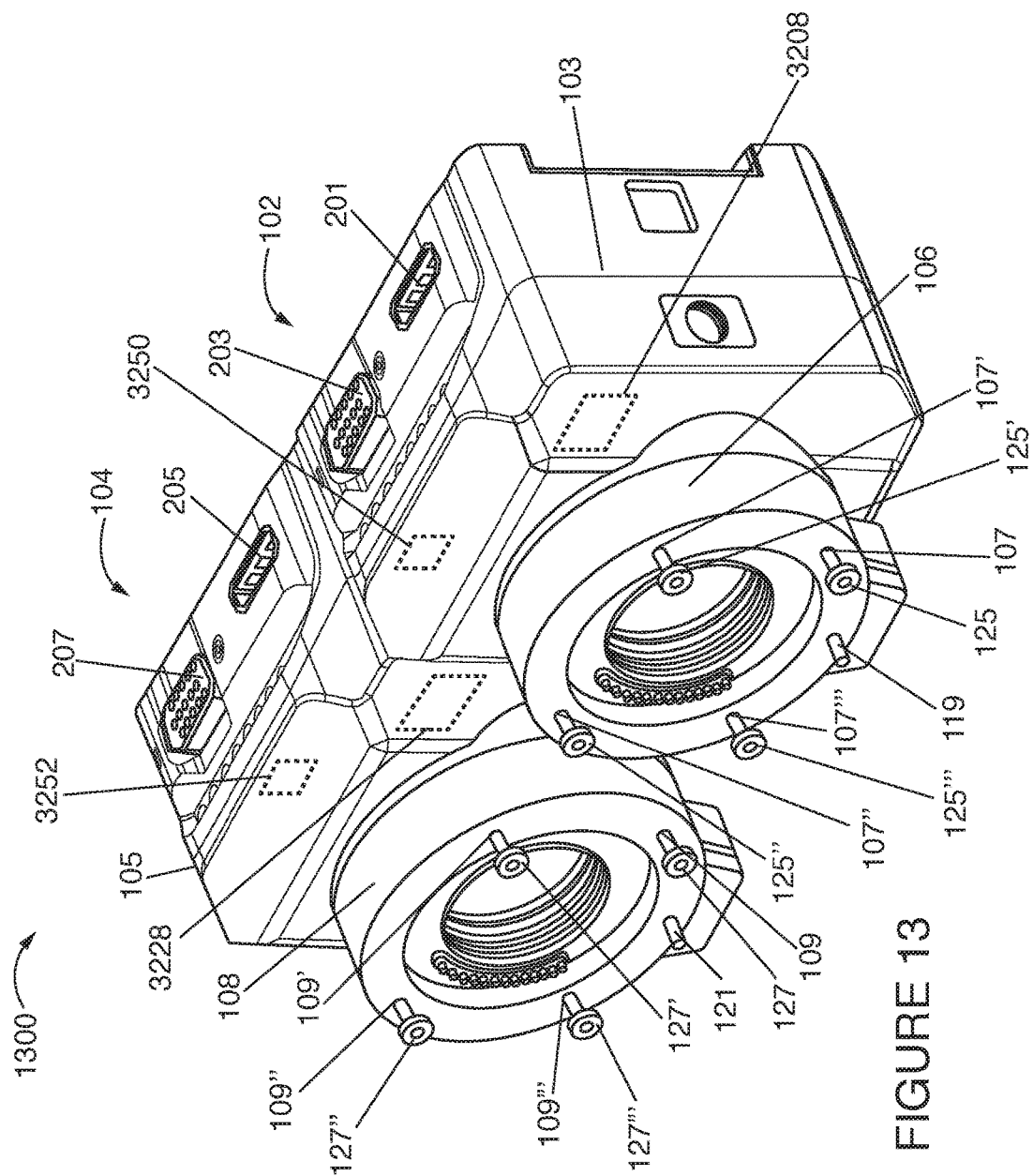
FIG. 13 illustrates an exemplary camera pair used in the exemplary camera apparatus of FIG. 1 in greater detail.

Drawing 1300 of FIG. 13 illustrates an exemplary camera pair (102, 104) used in the exemplary camera apparatus of FIG. 1 in greater detail. FIG. 13 illustrates left eye camera body 103 and its collar 106. FIG. 13 illustrates interface connectors 201 and 203 included in camera body 103 of camera device 102. FIG. 13 shows screws (125, 125', 125", 125''') screwed in screw holes (107, 107', 107", 107''') of collar 106. FIG. 13 also illustrates alignment pin 119 extending out of collar 106. Alignment pin 119 is accepted by hole 908 in the dual element mounting plate 110. FIG. 13 illustrates right eye camera body 105 and its collar 108. FIG. 13 illustrates interface connectors 205 and 207 included in camera body 105 of camera device 103. FIG. 13 shows screws (127, 127', 127", 127''') screwed in screw holes (109, 109', 109", 109''') of collar 108. FIG. 13 also illustrates alignment pin 121 extending out of collar 108. Alignment pin 121 is accepted by hole 928 in the dual element mounting plate 110.

Drawing 1300 further illustrates image sensor 3208 of camera device 102 which is included in camera body 103, which serves as a sensor holder. Drawing 1300 further illustrates image sensor 3228 of camera device 104 which is included in camera body 105, which serves as a sensor holder. Drawing 1300 further illustrates a first processor 3250 of camera device 102 which is included in camera body 103. Drawing 1300 further illustrates a second processor 3252 of camera device 104 which is included in camera body 105.

Figure 14:
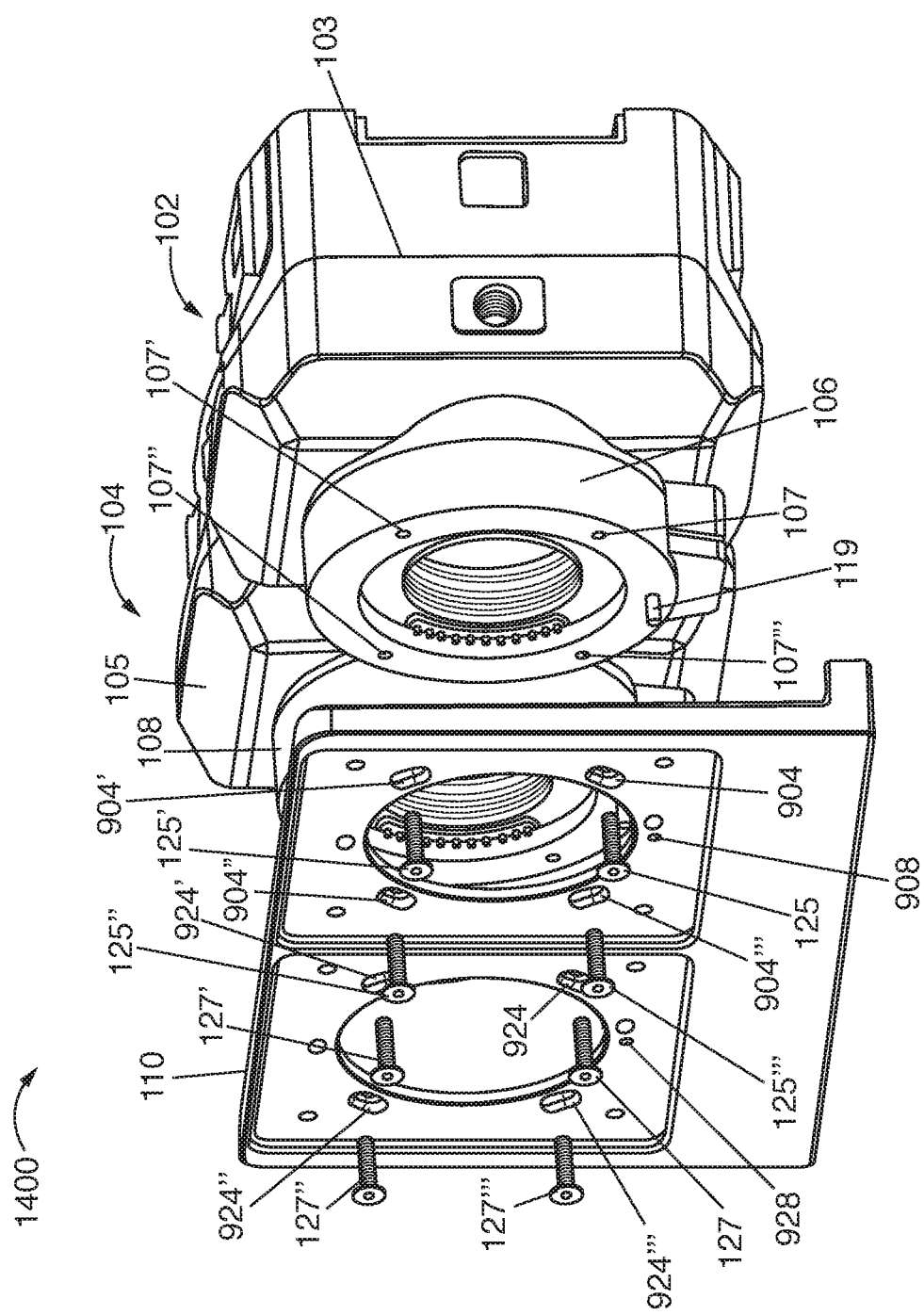
FIG. 14 illustrates a portion of the exemplary camera apparatus of FIG. 1 showing the dual element mounting plate, camera bodies and screws that secure the dual element mounting plate to the camera bodies.

Drawing 1400 of FIG. 14 illustrates a portion of the exemplary camera apparatus of FIG. 1 showing the dual element mounting plate 110, camera devices (102, 104) including camera bodies (103, 105) and screws (125, 125', 125", 125'''), (127, 127', 127", 127''') that secure the dual element mounting plate 110 plate to the camera bodies (103, 105). Screws (125, 125', 125", 125''') pass through slotted holes (904, 904', 904", 904''') and screw into screw holes (107, 107', 107", 107''') of collar 106 to secure the dual element mounting plate 110 to camera body 103. Alignment pin 119 of collar 106 mates with alignment hole 908 of the dual element mounting plate during installation. Screws (127, 127', 127", 127''') pass through slotted holes (924, 924', 924", 924''') and screw into screw holes (109, 109', 109", 109''') of collar 108 to secure the dual element mounting plate 110 to camera body 105. Alignment pin 121 of collar 108 mates with alignment hole 928 of the dual element mounting plate during installation. Alignment pin 121 and screw holes (109, 109', 109", 109''') are obscured from view in FIG. 14, but may be seen in FIG. 13. Slotted holes (904, 904', 904", 904''') facilitate positioning adjustment of camera body 103 including image sensor 3208 with respect to the dual element mounting plate 110. Slotted holes (924, 924', 924", 924''') facilitate positioning adjustment of camera body 105 including image sensor 3228 with respect to the dual element mounting plate 110.

FIG. 15 shows an exemplary camera rig plate 1500, which is a support plate, to which one or more mounted pairs of stereoscopic sensor holders, e.g., camera bodies or sensor mounts, can be secured to form an image capture apparatus that can capture stereoscopic images from one or more positions, e.g., up to a 360 degree view depending on the number of stereoscopic pairs which are mounted. In some embodiments the camera rig plate 1500 is secured to a support device such as a tripod or 4 legged support, e.g. via screws 1551 inserted through holes (1550, 1550', 1550", 1550''', 1552, 1552', 1552", 1552''', 1554, 1554', 1554", 1554'''). Support plate 1500 includes four recessed areas (1502, 1502', 1502", 1502''') for accepting four dual element mounting plate, e.g., four dual element mounting plates 110 or four dual element mounting plates 1100, each dual element mounting plate corresponding to a different stereoscopic camera pair. In some embodiments, the recessed area is formed to approximately match the outline of the base (1202 or 2200) of the dual element mounting plate, e.g., 110 or 1100, e.g., the recessed area is slightly larger than the outline of the base of dual element mounting plate to allow for some adjustment. Support plate 1500 includes screw holes (1504, 1504', 1504") for accepting mounting screws used to secure a first dual element mounting plate to the support plate 1500. Support plate 1500 includes screw holes (1514, 1514', 1514") for accepting mounting screws used to secure a second dual element mounting plate to the support plate 1500. Support plate 1500 includes screw holes (1524, 1524', 1524") for accepting mounting screws used to secure a third dual element mounting plate to the support plate 1500. Support plate 1500 includes screw holes (1534, 1534', 1534") for accepting mounting screws used to secure a fourth dual element mounting plate to the support plate 1500.

In some embodiments, e.g., an embodiment, in which the dual element mounting plates are dual element mounting plates (110, 110', 110", 110'''), where plates 110', 110", 110''' are the same as plate 110, the screw holes (1504, 1504', 1504", 1514, 1514', 1514", 1524, 1524', 1524", 1534, 1534', 1534") are threaded holes which accept screws, e.g., screws (139, 139', 139") which are used to secure the dual element mounting plates (110, 110', 110", 110''') to the support plate 1500. In some such embodiments, the holes, e.g., holes (140, 142, 144) in flanges (141, 143, 145) are slightly larger in diameter than the screws (139, 139', 139") allowing for slight adjustments in mounting between the dual element mounting plate, e.g., dual element mounting plate 110, and the support plate 1500, to facilitate an alignment adjustment.

Figure 33:
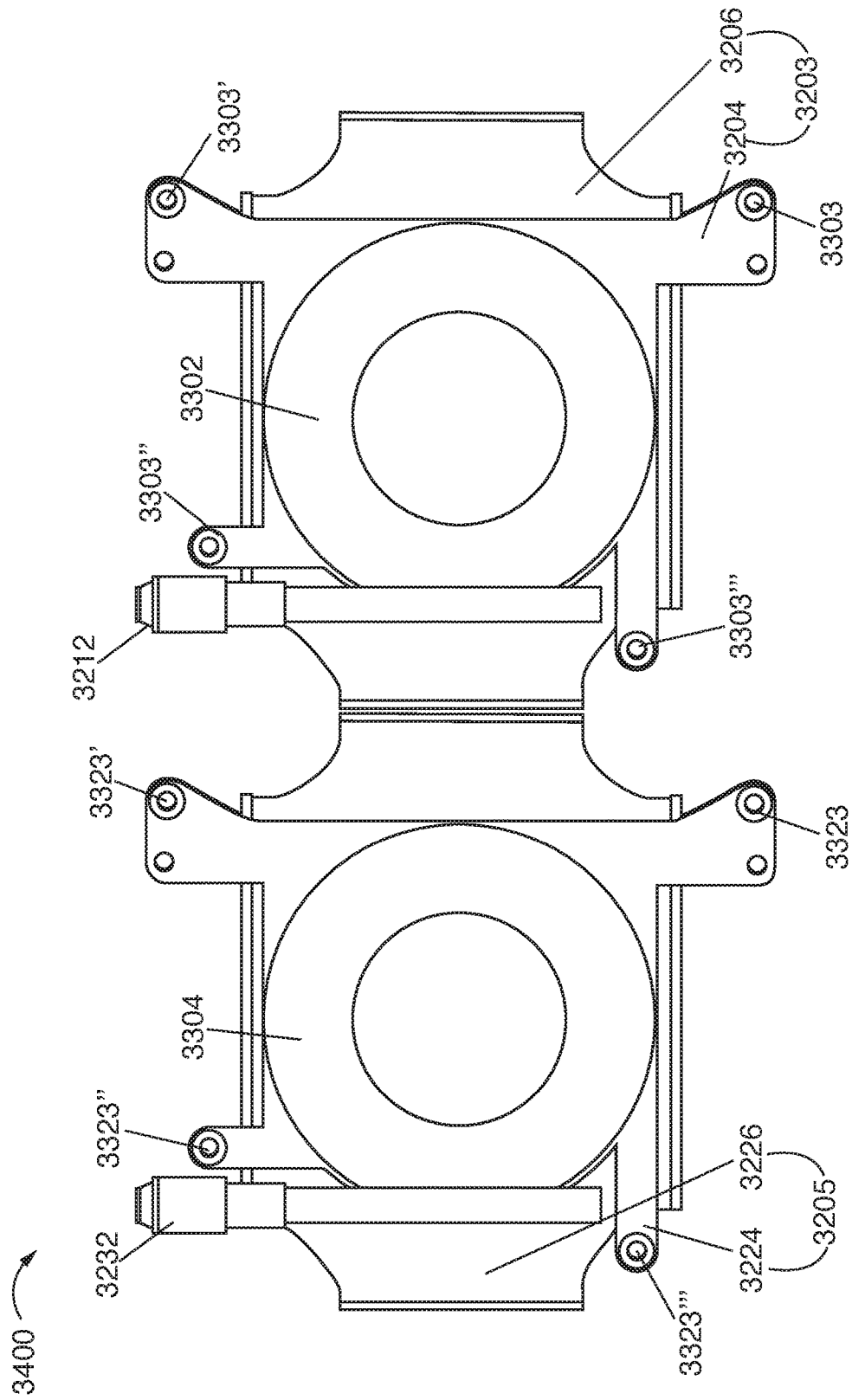
FIG. 33 is a drawing illustrating a view of the exemplary first and second sensor mounts of FIG. 32 from lens side.
Figure 34:
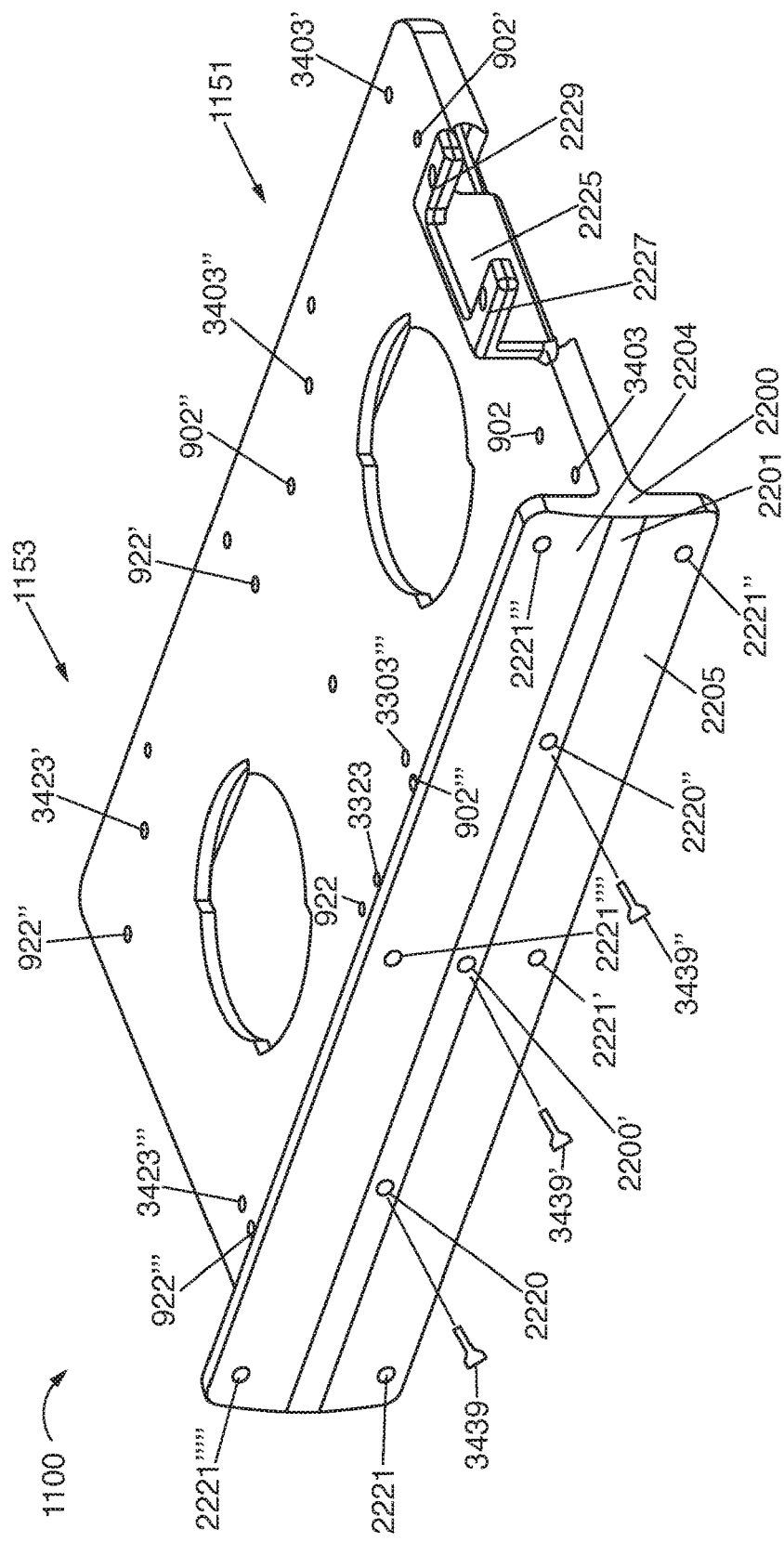
FIG. 34 illustrates an exemplary dual element mounting plate in accordance with one exemplary embodiment.

In some embodiments, e.g., an embodiment, in which the dual element mounting plates are dual element mounting plates (1110, 1110', 1110", 1110'''), where plates 1110', 1110", 11110''' are the same as plate 1110 shown in FIG. 34 and other FIGS. 16-34, the screw holes (1504, 1504', 1504", 1514, 1514', 1514", 1524, 1524', 1524", 1534, 1534', 1534") are pass through holes for mounting screws (1539, 1539', 1539", 1539, 1539', 1539", 1539, 1539', 1539", 1539, 1539', 1539", 1539, 1539', 1539") which are used to secure the dual element mounting plates (1110, 1110', 1110", 1110''') to the support plate 1500. The mounting screws, e.g., mounting screw 1539, are inserted from below the support plate 1500, through the support plate pass through holes, e.g. hole 1504, with mounting screws screwing into threaded holes, e.g., threaded holes (2220, 2220', 2220") in the base of the dual element mounting plate 1100. (See FIG. 34.) In some such embodiments, the pass through holes (1504, 1504', 1504", 1514, 1514', 1514", 1524, 1524', 1524", 1534, 1534', 1534") are slightly larger in diameter than the mounting screws (1539, 1539', 1539") allowing for slight adjustments in mounting between the dual element mounting plate, e.g., dual element mounting plate 1110, and the support plate 1500, to facilitate an alignment adjustment.

FIGS. 16-29 illustrate additional apparatus which can be used to mount lenses and camera sensor holders, e.g. camera bodies or camera sensor mounts, in stereoscopic pairs in a manner which allows different filters to be placed between a camera lens assembly and a camera sensor without having to remove the camera lens and/or camera sensor holders thereby allowing alignment between pairs of camera devices to be maintained while changes in filters being used are made.

Figure 16:
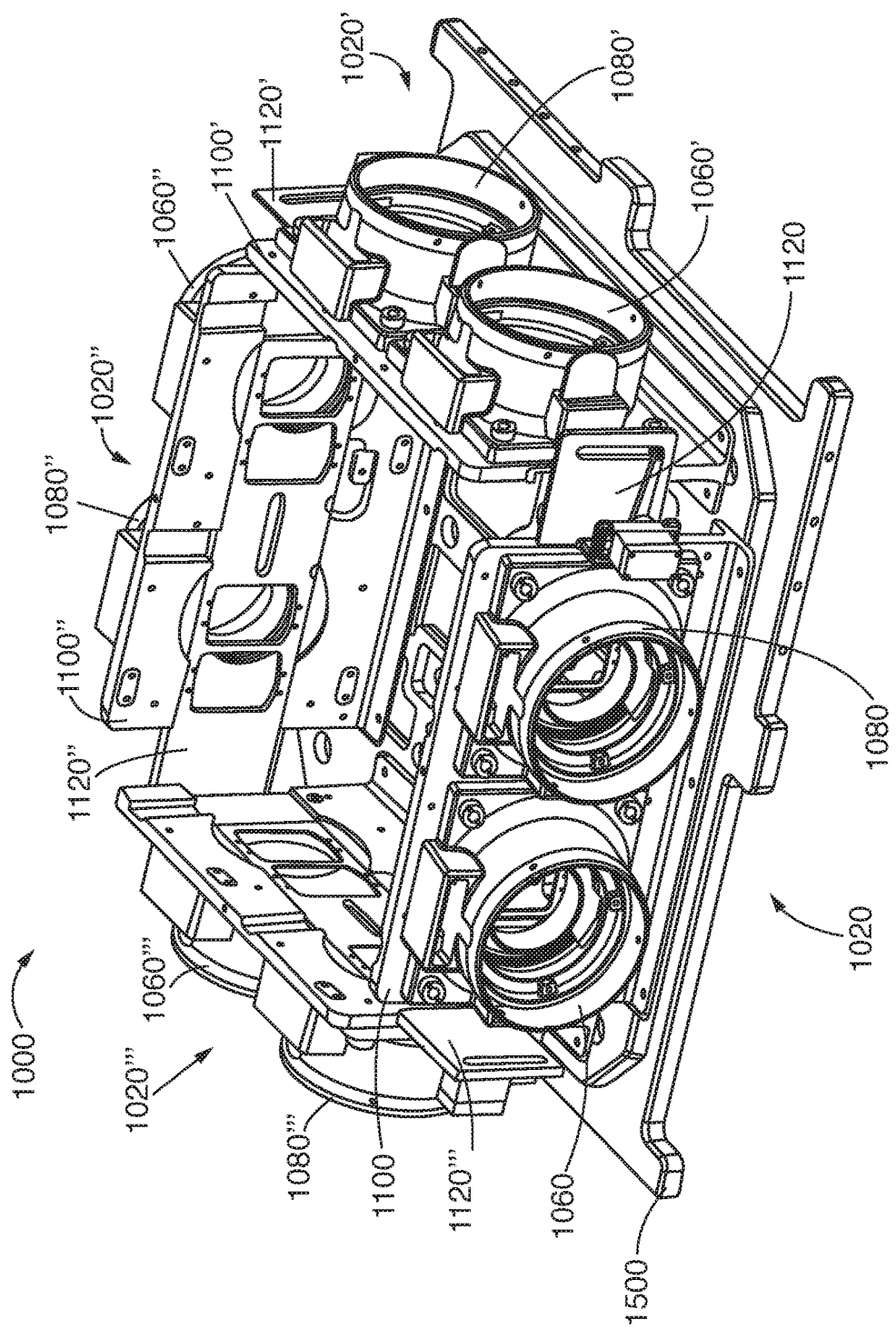
FIG. 16 illustrates a system which can be used to mount lenses and sensor holders in stereoscopic pairs in a manner which allows different filters to be placed between a camera lens assembly and a camera sensor without having to remove the camera lens and/or camera sensor holders thereby allowing alignment between pairs of camera devices to be maintained while changes in filters being used are made.

In FIG. 16 a system 1000 which can be used to mount 4 pairs of stereoscopic camera devices (1020, 1020', 1020", 1020''') is shown. Each stereoscopic device pair in the FIG. 16 example is mounted by using a different dual element mounting plate (1100, 1100', 1100", 1100''') into which a slideable filter plate (1120, 1120', 1120", 1120'''), respectively, is inserted. The four dual element mounting plates (1100, 1100', 1100", 1100''') are installed on the support plate 1500. A pair of individual lens mounts (left eye lens mounting collar assembly 1080 including a lens mounting plate, right eye lens mounting collar assembly 1060 including a lens mounting plate) are secured to dual element mounting plate 1100. A pair of individual lens mounts (left eye lens mounting collar assembly 1080' including a lens mounting plate, right eye lens mounting collar assembly 1060' including a lens mounting plate) are secured to dual element mounting plate 1100'. A pair of individual lens mounts (left eye lens mounting collar assembly 1080" including a lens mounting plate, right eye lens mounting collar assembly 1060" including a lens mounting plate) are secured to dual element mounting plate 1100". A pair of individual lens mounts (left eye lens mounting collar assembly 1080''' including a lens mounting plate, right eye lens mounting collar assembly 1060''' including a lens mounting plate) are secured to dual element mounting plate 1100'''.

Figure 17:
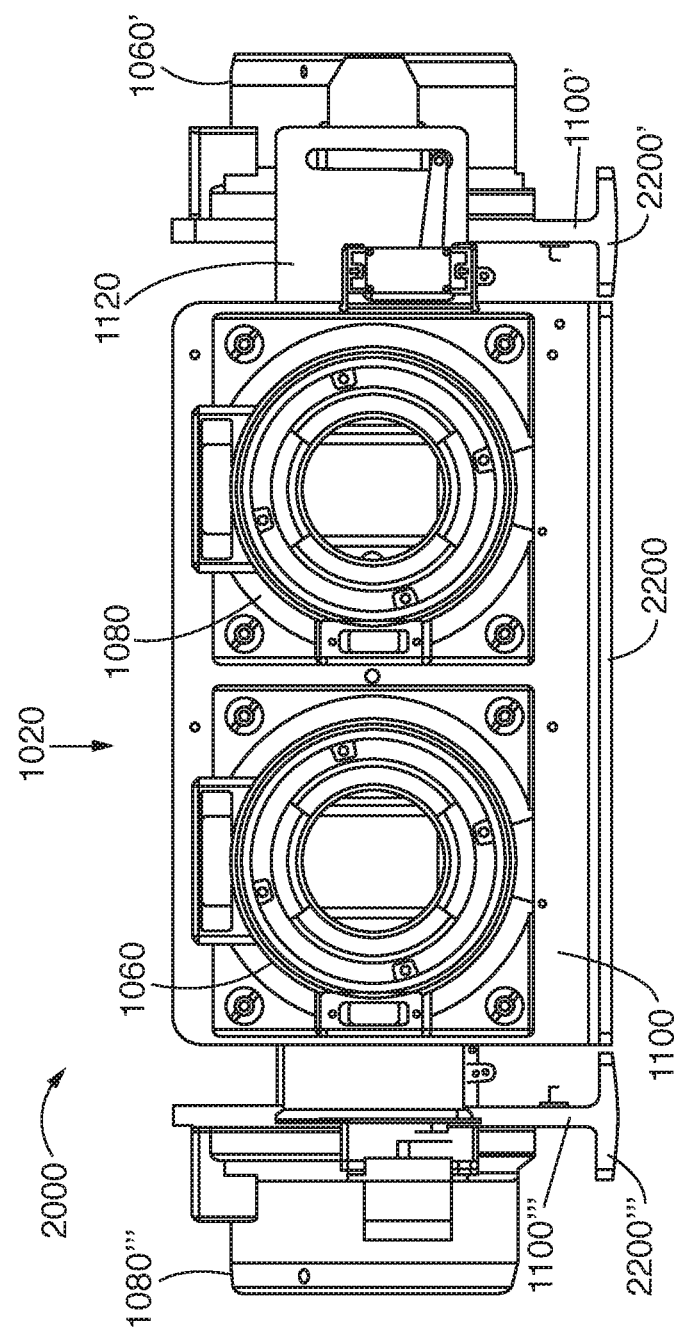
FIG. 17 illustrates a side view of 4 pairs of stereoscopic camera devices in accordance with an exemplary embodiment.

Drawing 2000 of FIG. 17 illustrates a side view of 4 pairs of stereoscopic camera devices (1020, 1020', 1020", 1020''') facing device pair 1020. In drawing 2000 left eye lens mounting collar assembly 1080, including a lens mounting plate, and right eye lens mounting collar assembly 1060, including a lens mounting plate, which are secured to dual element mounting plate 1100, are visible. In addition, slideable filter mounting plate 1120, which is inserted into dual element mounting plate 1100 is shown.

In FIG. 17, dual element mounting plate 1100' corresponding to another stereoscopic camera pair is also visible, as well as right eye lens mounting collar assembly 1060', which is secured to dual element mounting plate 1100'. In FIG. 17, dual element mounting plate 1100''' corresponding to yet another stereoscopic camera pair is visible, as well as left eye lens mounting collar assembly 1080', which is secured to dual element mounting plate 1100'.

In drawing 2000 of FIG. 17, the base portion (2200, 2200', 2200''') of each of the dual element mounting plates (1100, 1100', 1100'''), respectively, are also visible.

Figure 18:
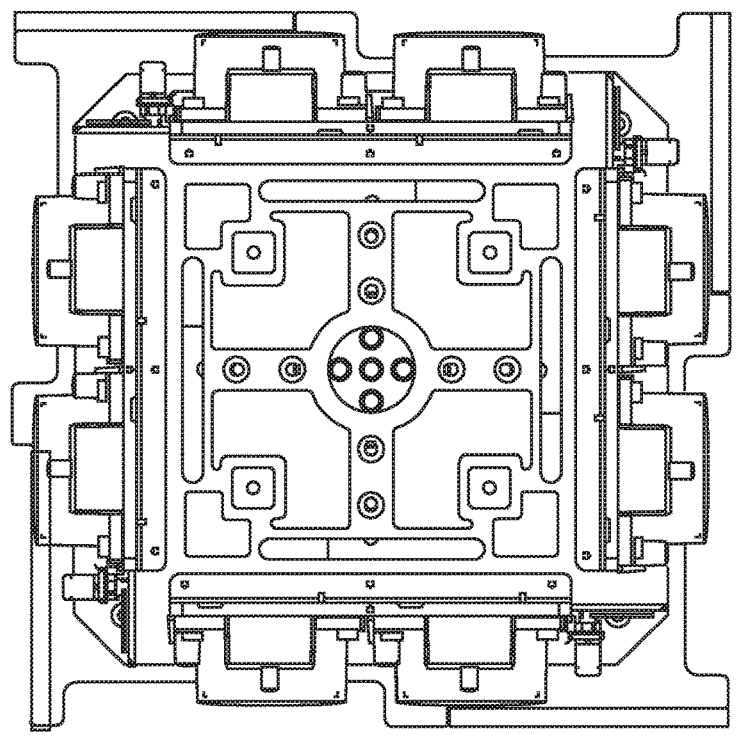
FIG. 18 is a drawing of a top view of the system of FIG. 16.

FIG. 18 is a drawing 1800 of a top view of the system 1000 of FIG. 16.

Figure 19:
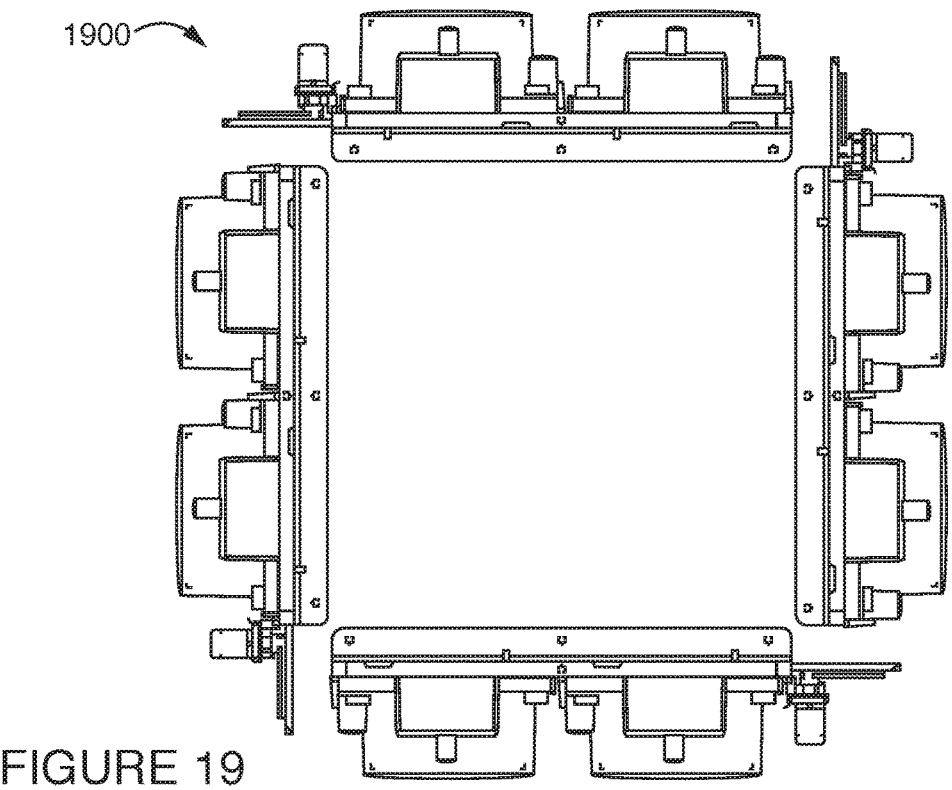
FIG. 19 is a drawing of a bottom view of the system of FIG. 16.

FIG. 19 is a drawing 1900 of a bottom view of the system 1000 of FIG. 16.

Figure 20:
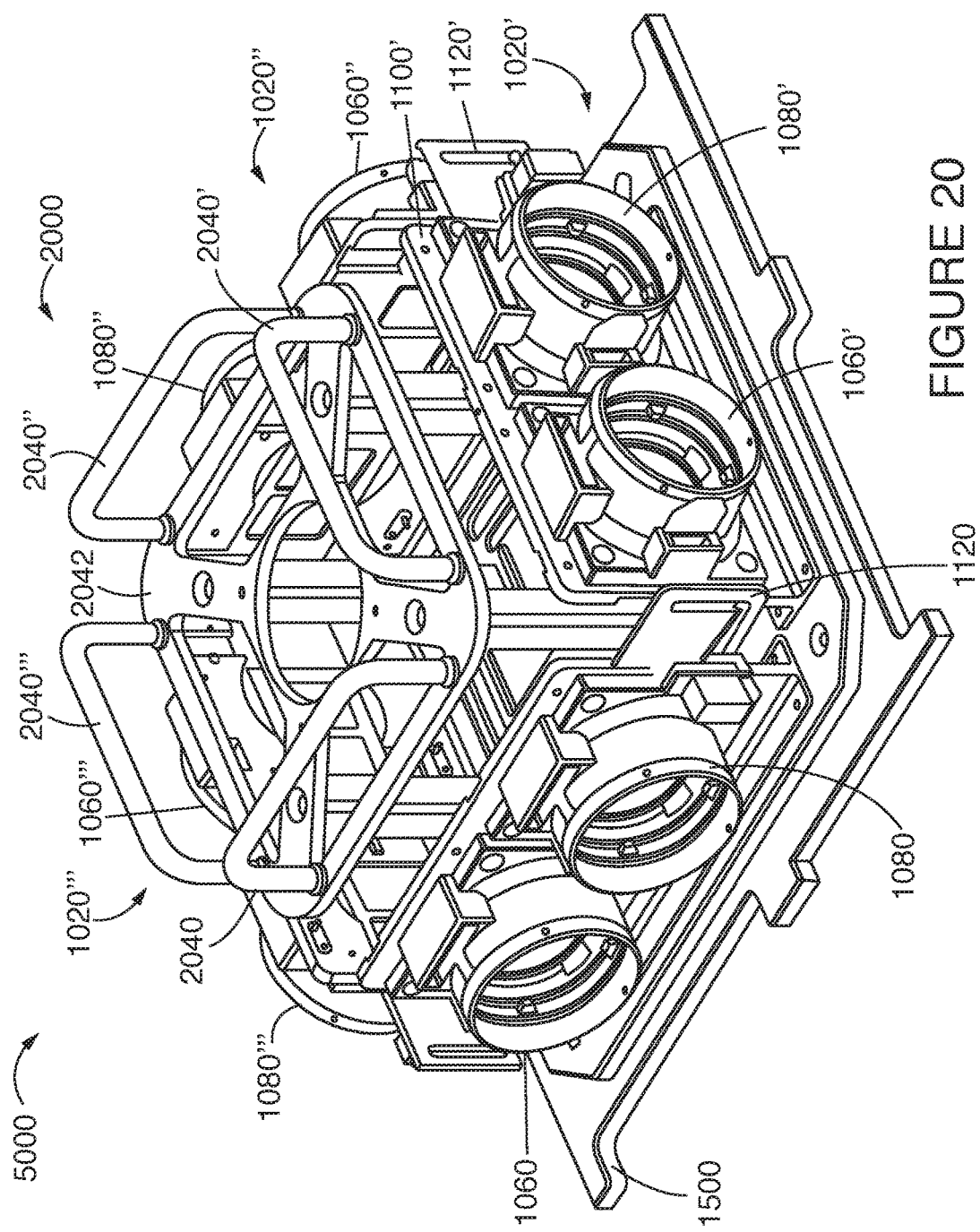
FIG. 20 is a drawing of an exemplary camera apparatus including the elements shown in FIG. 16 and further including a top support plate and handles.

FIG. 20 is a drawing of an exemplary camera apparatus 5000 including the elements shown in FIG. 16 and further including a top support plate 2042 and handles (2040, 2040', 2040'', 2040'''). The handles (2040, 2040', 2040'', 2040''') may be used for installing and removing the exemplary apparatus 5000, e.g., from a mounting on a tripod or support fixture. Additional components may be, and generally are, included as part of apparatus 5000 and at least some of the additional components are installed between the top support plate 2042 and the bottom support plate 1500, e.g., a camera rig plate. The additional components include, e.g., pairs of image sensor holders, e.g., pairs of camera bodies, e.g., camera body pair (103, 105) each including a sensor (3208, 3228) and a processor or pairs of sensor mounts (3203, 3205) each sensor mount (3203, 3205) including a sensor (3208, 3210).

Figure 21:
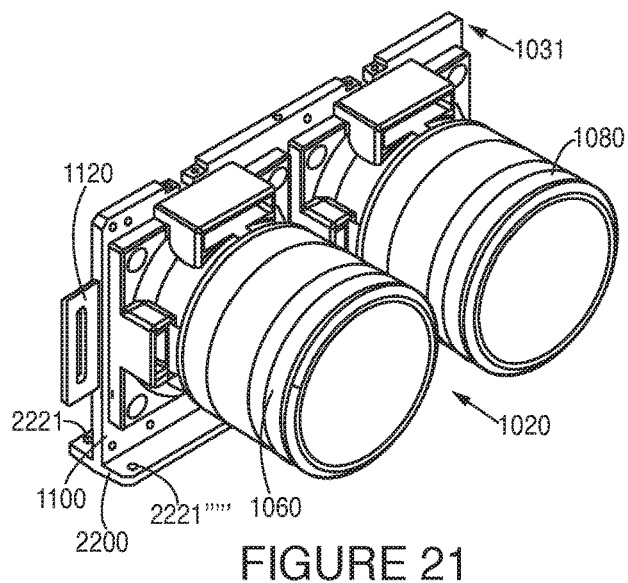
FIG. 21 illustrates an angled lens mounting side view of a dual element mounting plate including an inserted slideable filter plate and a pair of lens mounting collars in accordance with an exemplary embodiment.

FIG. 21 illustrates stereoscopic apparatus 1020 including dual element mounting plate 1100, right eye lens mounting collar assembly 1060, left eye lens mounting collar assembly 1080, and slideable filter mounting plate 1120 installed within dual element mounting plate 1100. Dual element mounting plate 1100 has a lens mounting side 1031. Dual element mounting plate 1100 includes a base 2200, which includes multiple threaded screw holes (2220, 2220', 2220'') for receiving mounting screws for mounting the dual element mounting plate 1100 to a support plate, e.g., camera rig plate 1500. The threaded screw holes (2220, 2220', 2220'') are not visible in FIG. 21 but are visible in FIG. 34. Base 2200 also includes angled threaded screw holes (2221, 2221', 2221'', 2221''', 2221'''', 2221''''') including angled screw hole 2221 which extends through base 2200 through which a screw, e.g., a tilt adjustment screw 2250, is inserted to apply pressure between the edge of the dual element mounting plate 1100 and a support plate, e.g., support plate 1500, to which the dual element mounting plate 1100 is being secured, the distance to which the screw 2250 is inserted into the threaded hole 2221 controls the vertical orientation of the dual element mounting plate 1100 relative to the support plate, e.g., support plate 1500. By having tilt adjustment screw holes on each side of dual element mounting plate 1100, e.g., tilt adjustment screw holes (2221, 2221'''''), the tilt of the dual element mounting plant can be adjusted with respect to the support plate 1500.

Figure 22:
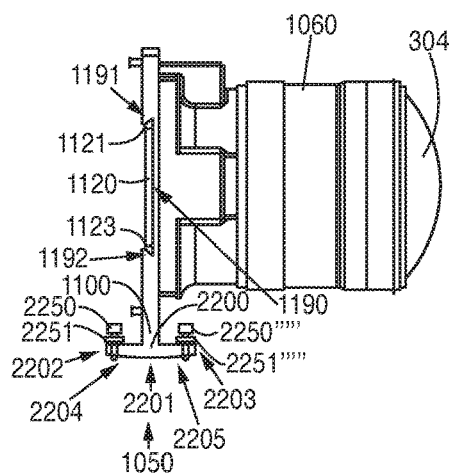
FIG. 22 illustrates a side view of a dual element mounting plate illustrating the slot for the slideable filter plate and features of the base and further illustrates a wide angle lens installed in a lens mounting collar which is mounted on the dual element mounting plate in accordance with an exemplary embodiment.

FIG. 22 illustrates that the dual element mounting plate 1100 includes a slot 1190 in which the slideable filter plate 1120 is inserted and slides. Slot 1190 includes angled recesses or channels (1191, 1192) on the top and bottom to receive slideable filter plate lips (1121, 1123). Slot 1190 includes an upper channel 1191 which forms a top portion of slot 1190. Slot 1190 includes a lower channel 1192 which forms a bottom portion of slot 1190. FIG. 22 further illustrates a wide angle lens, e.g., fisheye lens 304, is mounted on the right eye lens mounting collar assembly 1060, which is mounted to the dual element mounting plate 1100. Similarly, another wide angle lens, e.g., fisheye lens 302, is mounted on the left eye lens mounting collar assembly 1080.

FIG. 22 illustrates that the base 2200 of dual element mounting plate 1100 includes a curved or tapered bottom portion 1050. FIG. 22 further illustrates, that in one embodiment, the bottom portion 1050 of the base 2200 of the dual element mounting plate includes a small flat area 2201 in the center, and two tapered portions (2204, 2205), and the base tapers on each side, as moving out from the center to each side (2202, 2203). This design of the small center flat area and taper toward the sides, facilitates and/or allows for adjustment of the vertical orientation of dual element mounting plate 1100, e.g., when being secured to a support plate, e.g., camera rig plate 1500. For example, holes (2220, 2220', 2220'') in the flat portion 2201 of the bottom portion 1050 of base 2200, which are shown in FIG. 34, are threaded screw holes through which mounting screws (3439, 3439', 3439'') coming up the bottom through the support plate 1500 are used to secure, e.g., lock, the dual element mounting plate 1100 to the support plate 1500. Other threaded holes (2221, 2221', 2221'', 2221''', 2221'''', 2221''''') in dual element mounting plate 1100 are threaded holes, e.g., angled threaded holes, through which tilt adjustment screws (2250, 2250', 2250'', 2250''', 2250'''', 2250''''') are inserted from the top to be forced against the support plate 1500, the depth of the inserted screws being used to control, e.g., set or adjust, the vertical orientation of the dual element mounting plate 1100. In some embodiments, the tilt adjustment screws (2250, 2250', 2250'', 2250''', 2250'''', 2250''''') include an Allen key head. In another embodiment, the tilt adjustment screws (2250, 2250', 2250'', 2250''', 2250'''', 2250''''') are set type screw and include a slotted head. In some embodiments, the tilt adjustment screws (2250, 2250', 2250'', 2250''', 2250'''', 2250''''') include a rounded end point for applying pressure to the support plate 1500 without digging into and damaging the support plate. In some embodiments, the screw holes (2221, 2221', 2221'', 2221''', 2221'''', 2221''''') each include a locking insert for maintaining the screw height setting at the desired set point. In some embodiments, a nut (2251, 2251', 2251'', 2251''', 2251'''', 2251''''') is included to lock the tilt adjusting screw (2250, 2250', 2250'', 2250''', 2250'''', 2250''''') against the top of the base of the dual element mounting plate 1100 at the desired screw height setting when the desired tilt is achieved.

Figure 23:
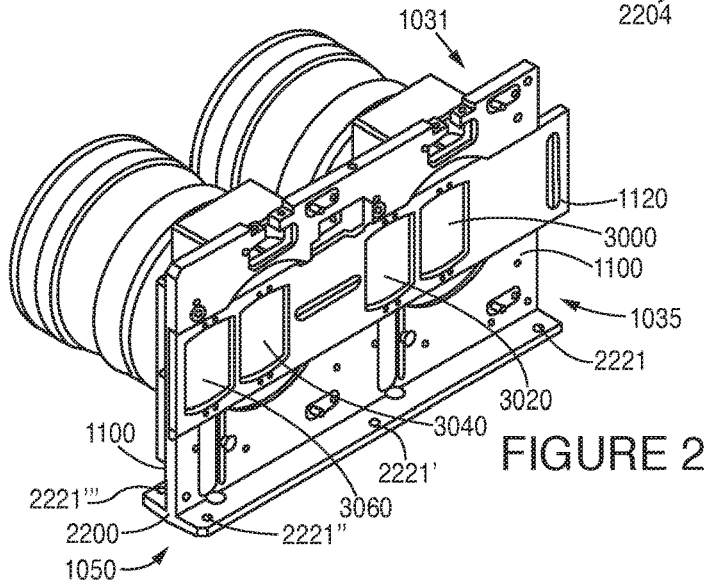
FIG. 23 illustrates an angled sensor holder mounting side view of the dual element mounting plate with a slideable filter plate installed and further illustrates features related to mounting and vertical alignment.
Figure 24:
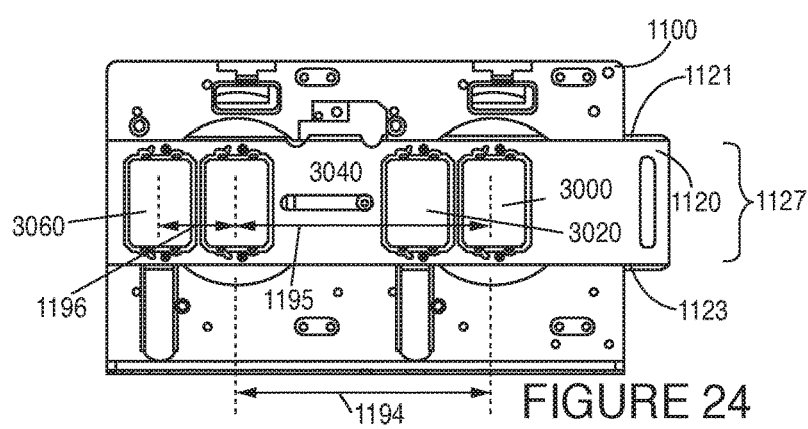
FIG. 24 illustrates a sensor holder mounting side view of the dual element mounting plate with a slideable filter plate installed and illustrates spacing relationships between filter mount positions and lens opening positions in accordance with an exemplary embodiment.
Figure 29:
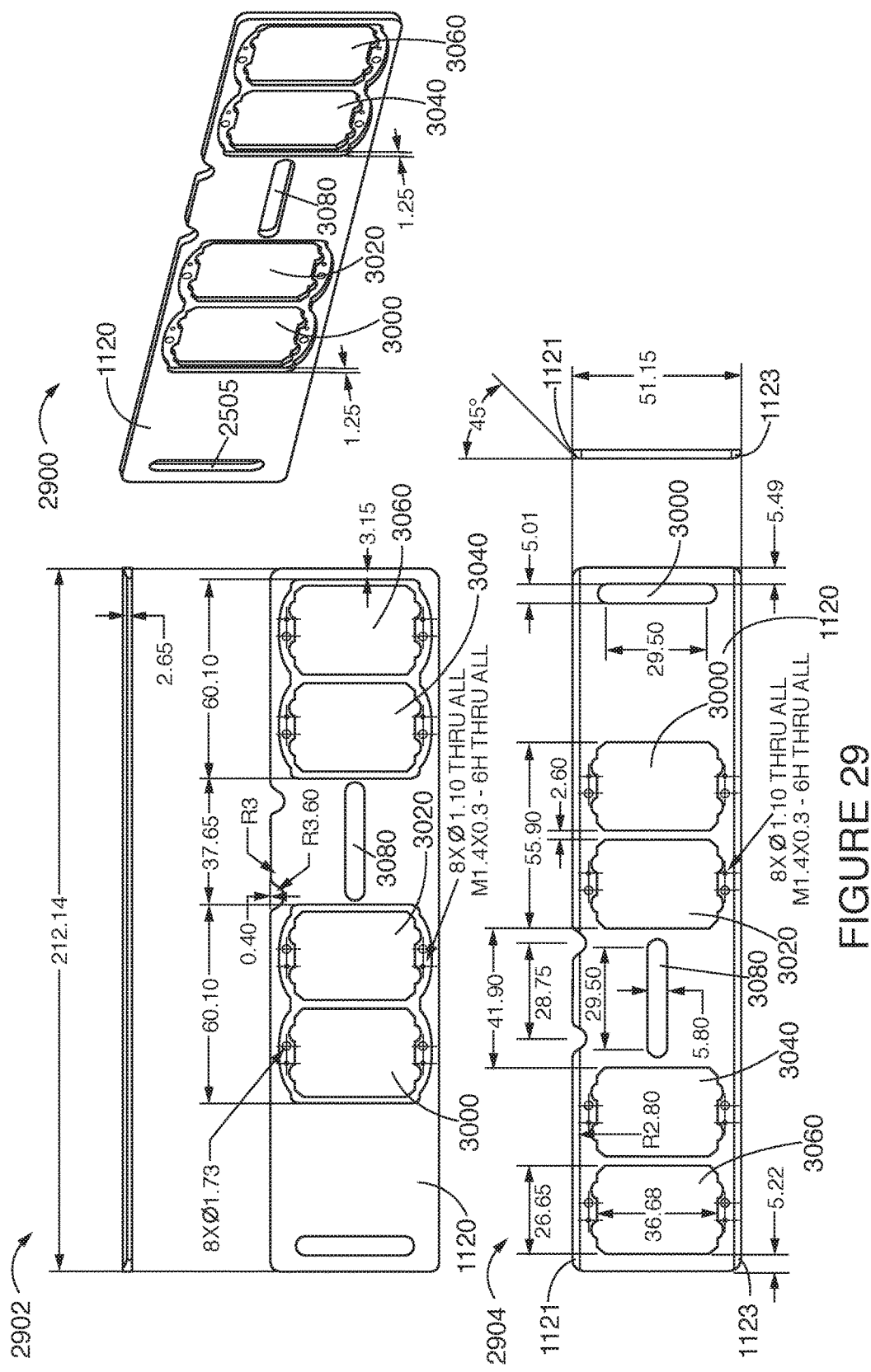
FIG. 29 illustrates 3 views of exemplary slideable filter plate in accordance with an exemplary embodiment.

An exemplary slideable filter plate, e.g., slideable filter plate 1120, can be seen in more detail in FIGS. 23, 24 and 29. FIG. 23 shows the slideable filter plate 1120 from the side to which the sensor holders are secured. Slideable filter plate 1120 includes a plurality of pairs ((3000, 3040), (3020, 3060)) of filter mounting positions. Filter mounting positions include a first pair of positions 3000, 3040 and a second pair of filter mounting positions 3020, 3060. The first pair (3000, 3040) of filter mounting positions includes a first right camera filter mounting position 3000 and a first left camera filter mounting position 3040. The second pair (3020, 3060) of filter mounting positions includes a second right camera filter mounting position 3020 and a second left camera filter mounting position 3060. A center of the first left filter mounting position is separated from the center of the first right filter mounting position by a distance 1195 corresponding to the distance 1194 between a center of a left eye lens opening and a center of a right eye opening in said dual element mounting plate 110, a distance 1196 between the first left camera filter mounting position and the second left camera filter mounting position being less than the distance 1194 between the center of the left eye lens opening and the center of the right eye opening in said dual element mounting plate 1110, as shown in FIG. 24.

The slideable filter plate 1120 can be slid out of the dual element mounting plate 1100 and filters can be inserted into one or both of the filter mounting positions in each pair of filter mounting positions or a filter may be omitted from one set (e.g., a pair) of filter mounting positions. For example, positions 3000, 3040 may have a filter of a first type mounted in these positions and positions 3020, 3060 may be left empty or have a filter of a second type. By sliding the slideable filter plate 1120 the camera operation in such a case may switch between using filters on the camera pairs to using no filters by simply changing the position of the slideable filter plate 1120 or can change between the types of filters being used. While two pairs of filter mounts are shown, it is possible that the filter slideable filter plate 1120 includes positions for additional filters. By simply sliding the filter mounting plate 1120 a change in the filters being used can be easily and quickly made without affecting the alignment or spacing of lenses and sensor holders, e.g., camera bodies or sensor mounts, mounted to the assembly shown in FIGS. 21-24 which, in some embodiments, forms a stereoscopic camera pair or a portion of a stereoscopic camera pair including filters, lenses, and sensor holders, each sensor holder holding an image sensor. In this way the filter, lens and sensor holder mounting apparatus shown in FIG. 23 and various other figures greatly simplifies camera operation as compared to systems where lenses and/or sensor holder movement is required to change a filter. Consider for example that the wide angle lens 304, e.g., a fish eye lens, shown in FIG. 22 need not be moved to change the filters mounted on slideable filter plate 1120.

FIG. 23 illustrates that dual element mounting plate 1100 includes multiple tilt adjustment screw holes, e.g., angled screw holes, including screw holes (2221, 2221' and 2221'', 2221''') through which tilt adjustment screws (2250, 2250', 2250'', 2250''') are inserted for adjusting the verticality of the dual element mounting plate 1100 relative to a support plate, e.g., camera rig plate 1500. Multiple dual element mounting plates can be secured to camera rig plate 1500. FIG. 23 identifies lens mounting side 1031 of dual element mounting plate 1100 and sensor holder mounting side 1035 of dual element mounting plate 1100.

FIG. 24 illustrates that slideable filter plate 1120 includes an upper lip 1121 and a lower lip 1123. The upper lip 1121 extends into an upper channel 1191 in the dual element mounting plate 1110 which forms a top portion of the slot 1190. The lower lip 1123 extends into a lower channel 1192 in the dual element mounting plate 1100 which forms a bottom portion of said slot 1190. The upper lip 1121 includes an angled portion that extends beyond the edge of the narrower back portion 1127 of the slideable filter plate 1120. The lower lip 1123 includes an angled portion that extends beyond the edge of the narrower back portion 1127 of the slideable filter plate 1120. The upper and lower lips (1121, 1123) are located on a lens mounting side 1031 of the dual element mounting plate 1100 and block light entry into a left sensor holder and a right sensor holder secured to the sensor holder mounting side 1035 of the dual element mounting plate 1100.

In FIG. 24, distance 1194 is the distance between a center of a left eye lens opening and a center of a right eye lens opening in the dual element mounting plate 1100. Distance 1195 is the distance between the center of the first left filter mounting position 3040 and the center of the first right filter mounting position 3000. Distance 1196 is the distance between the center of the first left camera filter mounting position 3040 and the center of the second left camera filter mounting position 3060. Distance 1195 is the same or substantially the same as distance 1194. It may be observed that the center of the first left eye mounting position 3040 is separated from the center of the first right eye filter mounting position 3000 by a distance 1195 corresponding to the distance 1194 between a center of a left eye lens opening and a center of a right eye lens opening in the dual element mounting plate 1100, and the distance between the first left camera filter mounting position and the second left camera filter mounting position 1196 is less than the distance 1194 between the center of the left eye lens opening and the center of the right eye lens opening in the dual element mounting plate 1100.

In FIG. 21-24 the dual element mounting plate 1110 and slideable filter plate 1120 is shown for a design implementation in which slot 2505 is on right eye camera side, while in FIGS. 16-20, 25, and 30-31 the dual element mounting plate 1110 and slideable filter plate 2505 is shown for an alternative design implementation in which the slot 2505 is on the left eye camera side.

Figure 25:
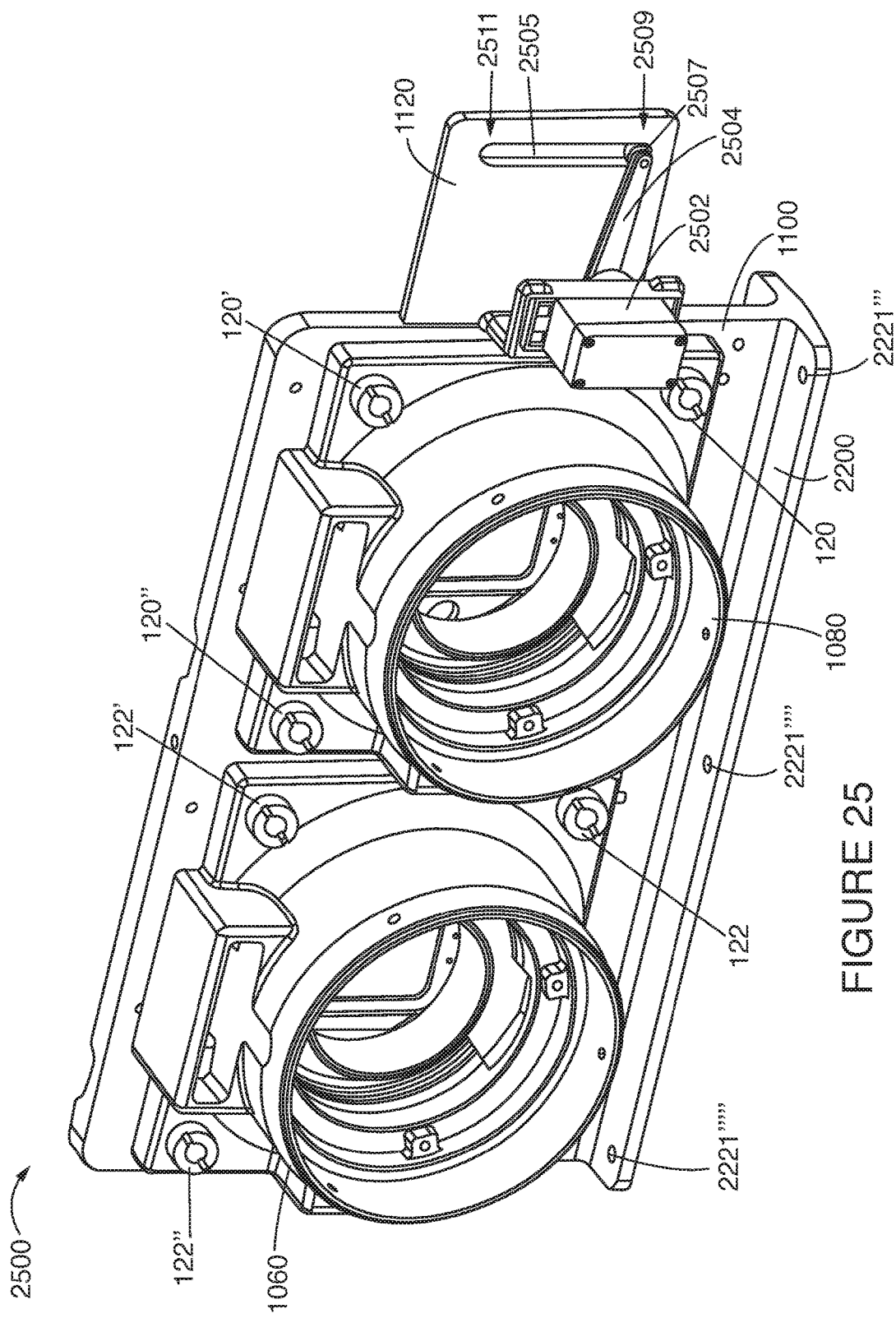
FIG. 25 is a drawing illustrating lens mounting collar assemblies installed in dual element mounting plate in accordance with an exemplary embodiment.

In FIG. 25 the first individual lens mount 1080, i.e. first lens mounting collar assembly including a lens mounting plate and the second individual lens mount 1060, i.e. second lens mounting collar assembly including a lens mounting plate, can be seen. The first and second lens assemblies, e.g., lens assembly 130 and lens assembly 132, are inserted into the first and second individual lens mounts 1080, 1060 respectively when the apparatus shown in FIG. 25 is to be used. Sensor holders, e.g., camera bodies, each camera body including a sensor mount, or sensor mounts, are secured to the back of the dual element mounting plate 1100, e.g., via screws, behind the filter mounting plate 1120 which slides inside a slot 1190 machined into the dual element mounting plate 1100. The base 2220 of the dual element mounting plate 1100 can be, and in some embodiments is, secured in the plate 1500 shown in FIG. 15. FIG. 21 illustrates tilt adjustment screw holes 2221''', 2221'''', and 2221''''', e.g., angled screw holes, in base 2200 via which screws (2250''', 2250'', 2250''''') may be inserted to adjust the tilt of the dual element mounting plate 1100 relative to a support plate, e.g., support plate 1500.

Drawing 2500 of Figure illustrates lens mounting collar assemblies (1080, 1060) mounted to dual element mounting plate 1100. Mount adjustment bushings (120, 120', 120'', 120''') are screwed into lens mounting collar assembly 1080 to achieve a desired adjustment spacing between the corners of the individual lens mounting collar assembly 1080 and the dual element mounting plate 1110. Mount adjustment bushings (122, 122', 122'', 122''') are screwed into lens mounting collar assembly 1060 to achieve a desired adjustment spacing between the corner of the individual lens mounting collar assembly 1060 and the dual element mounting plate 1110. Slideable filter plate 1120 is also shown installed in dual element mounting plate 1100. A solenoid 2502 is mounted on the dual element mounting plate 1100. Connecting rod 2504 couples the solenoid 2502 to the slideable filter plate 1120. The slideable filter plate 1120 is slid in the dual element mounting plate 1100 to align a selected pair of filter mounting positions with the pair of lens openings corresponding to lens mounting collar assemblies (1080, 1060). For example, solenoid 2502 is controlled to move, e.g., rotate, a shaft, to which the connecting rod 2504 is attached to, to an angular setting corresponding to the selected pair of filter mounting positions. In one embodiment, solenoid 2502 is coupled to connecting rod 2504 via a bellcrank. In another embodiment, connecting rod 2507 includes a bellcrank. As the connecting rod 2504 rotates about the shaft in response to processor controlled solenoid motion, the connecting rod end portion 2507, e.g., a roller, moves in slit 2505 of the slideable filter plate 1120 forcing the slideable filter plate 1120 to move, e.g., slide, in slot 1190 of the dual element mounting plate 1100 to the selected setting. In one embodiment, the slideable filter plate 1120 is positioned to one of two alternative positions, each of the alternative positions corresponding to connecting rod end portion 2507 being at one of the two ends (2509 or 2511) of slot 2505. In one such embodiment, when connecting rod end portion 2507 is at a first end 2507 of slot 2505, the solenoid 2502 is de-energized, and when the connecting rod end portion 2507 is at a second end 2511 of slot 2505, the solenoid 2502 is energized. In some embodiments, the slideable filter plate can be controllably positioned to more that two alternative positions, each alternative position corresponding to connecting rod end portion 2507 being at a different position in slot 2505, each alternative position corresponding to the alignment of a pair of filter mounting positions in slideable filter plate 1120 with a pair of lens in the camera pair. In some embodiments, instead of a solenoid, a stepper motor is used to drive the connecting rod 2504.

Base 2200 of dual element mounting plate 1100 includes threaded screw holes 2221, 2221' and 2221", e.g., angled threaded screw holes, via which adjustment screws are inserted and rotated to adjust the dual element mounting plate 1100 verticality relative to a base plate, e.g., rig base plate 1500. Screws (2250, 2250', 2250") exiting the threaded screws holes (2221, 2221' and 2221"), respectively, do not enter the rig base plate 1500, but are forced against it. In some embodiments the adjustment screws include rounded tips so as not to dig into and damage rig base plate 1500.

Figure 26:
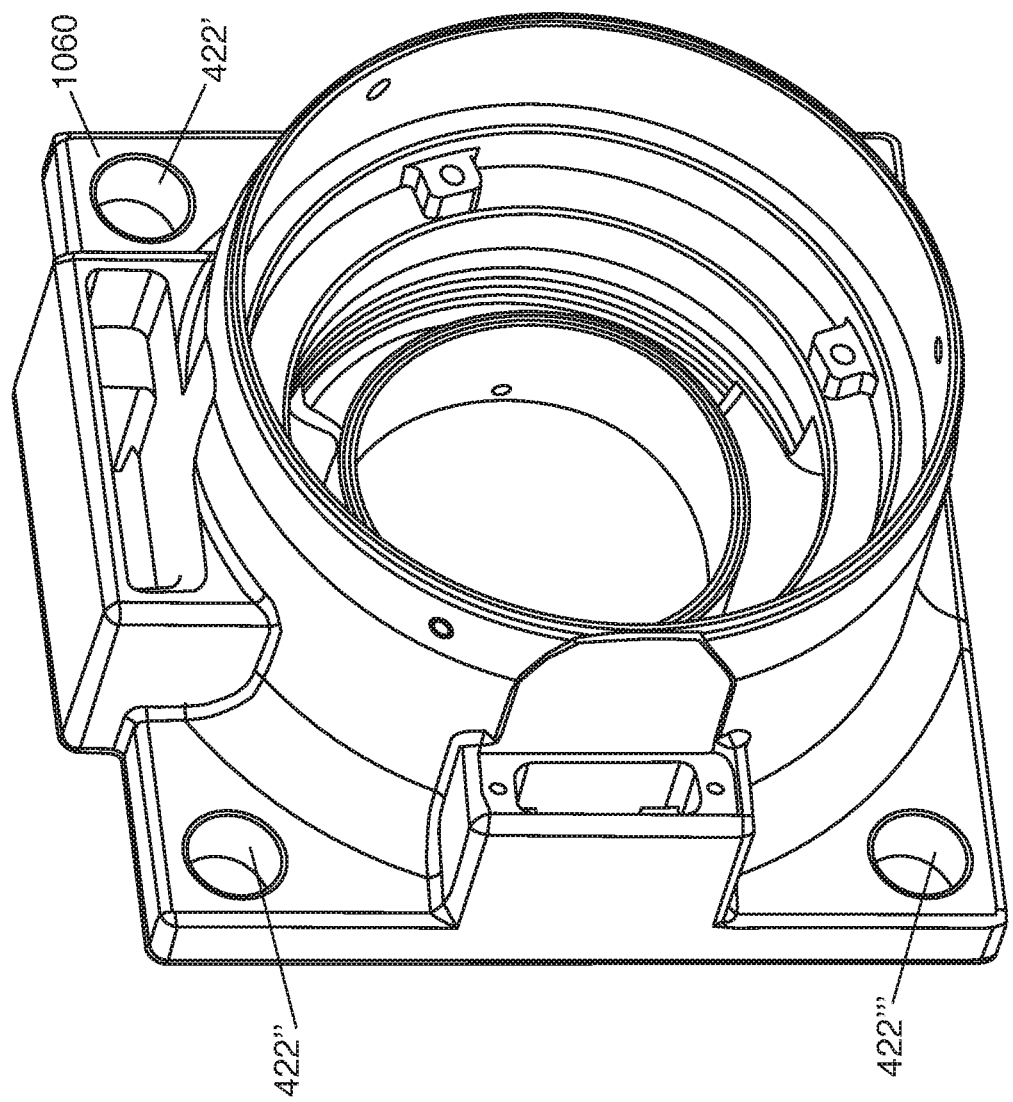
FIG. 26 illustrates a front angled view of lens mounting collar assembly in accordance with an exemplary embodiment.

FIG. 26 illustrates a front angled view of lens mounting collar assembly 1060 including a mounting plate. Lens mounting collar assembly 1060 includes threaded holes (422, 422', 422", 422''') in each corner. Spacer bushing (122, 122', 122", 122''') are screwed into threaded holes (422, 422', 422", 422''') for controlling the spacing between the corners of the lens mounting collar 1060 and the dual element mounting plate 1100. Similarly, lens mounting collar assembly 1080 includes threaded holes (402, 402', 402", 402''') in each corner. Spacer bushing (120, 120', 120", 120''') are screwed into threaded holes (402, 402', 402", 402''') for controlling the spacing between the corners of the lens mounting collar 1080 and the dual element mounting plate 1100.

Figure 27:
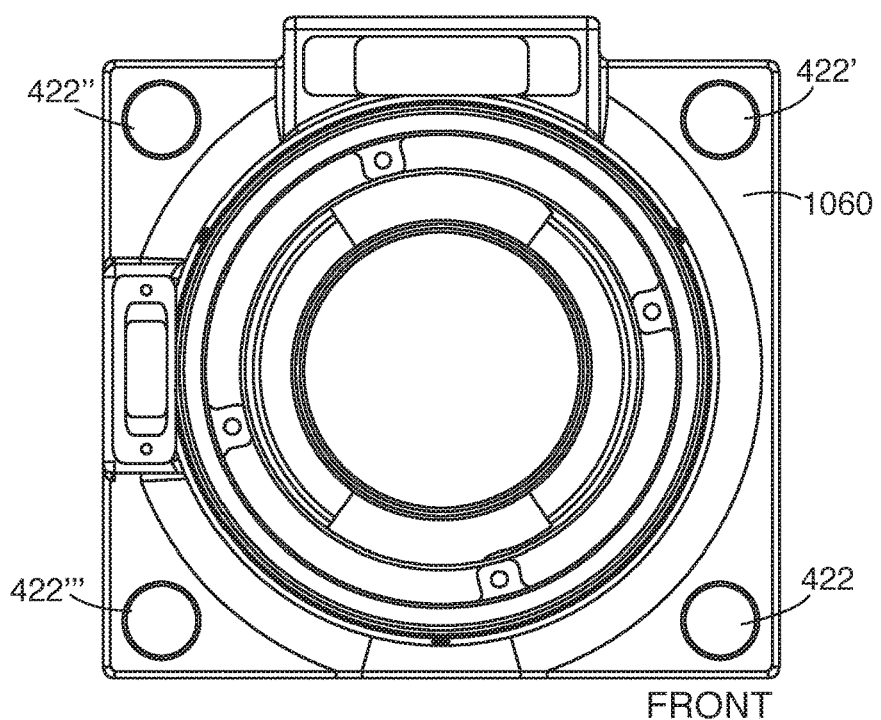
FIG. 27 illustrates a front view of lens mounting collar assembly in accordance with an exemplary embodiment.

FIG. 27 illustrates a front view of lens mounting collar assembly 1060.

Figure 28:
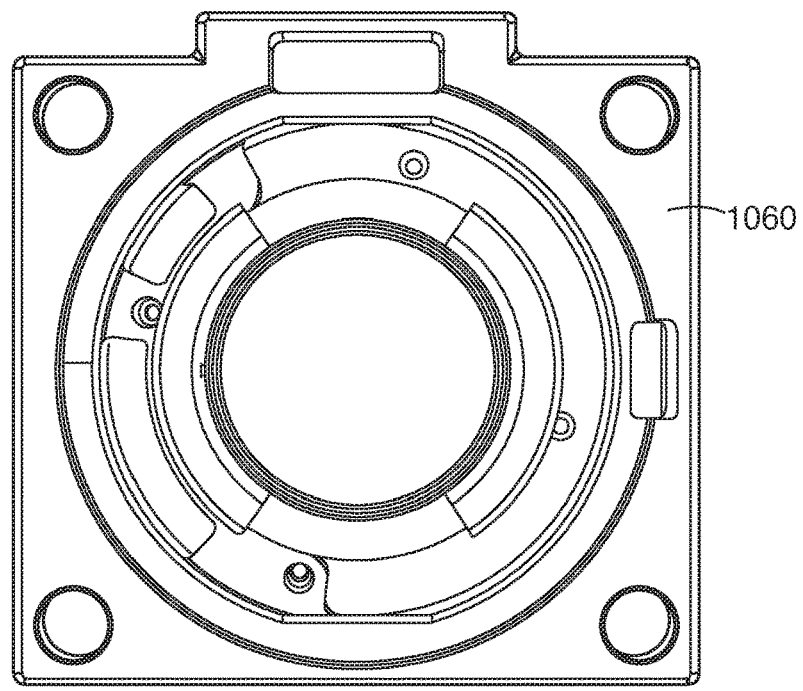
FIG. 28 illustrates a rear view of lens mounting collar assembly in accordance with an exemplary embodiment.

FIG. 28 illustrates a rear view of lens mounting collar assembly 1060.

FIG. 29 illustrates 3 views of exemplary slideable filter plate 1120 including dimensions in one exemplary embodiment. Various exemplary dimensions shown are in metric, e.g., with distances being in mm. Drawing 2900 of FIG. 29 illustrate an angled view of slideable filter plate 1120 including a first pair of filter mounting positions (3000, 3040), a second pair of filter mounting positions (3020, 3060), vertical slot 2505 and horizontal guide slot 3080. Drawing 2902 illustrates a first side of slideable filter plate 1120. Drawing 2904 illustrates a second side of slideable filter plate 1120 and further illustrates angled upper lip portion 1121 and angled lower lip portion 1123.

Figure 30:
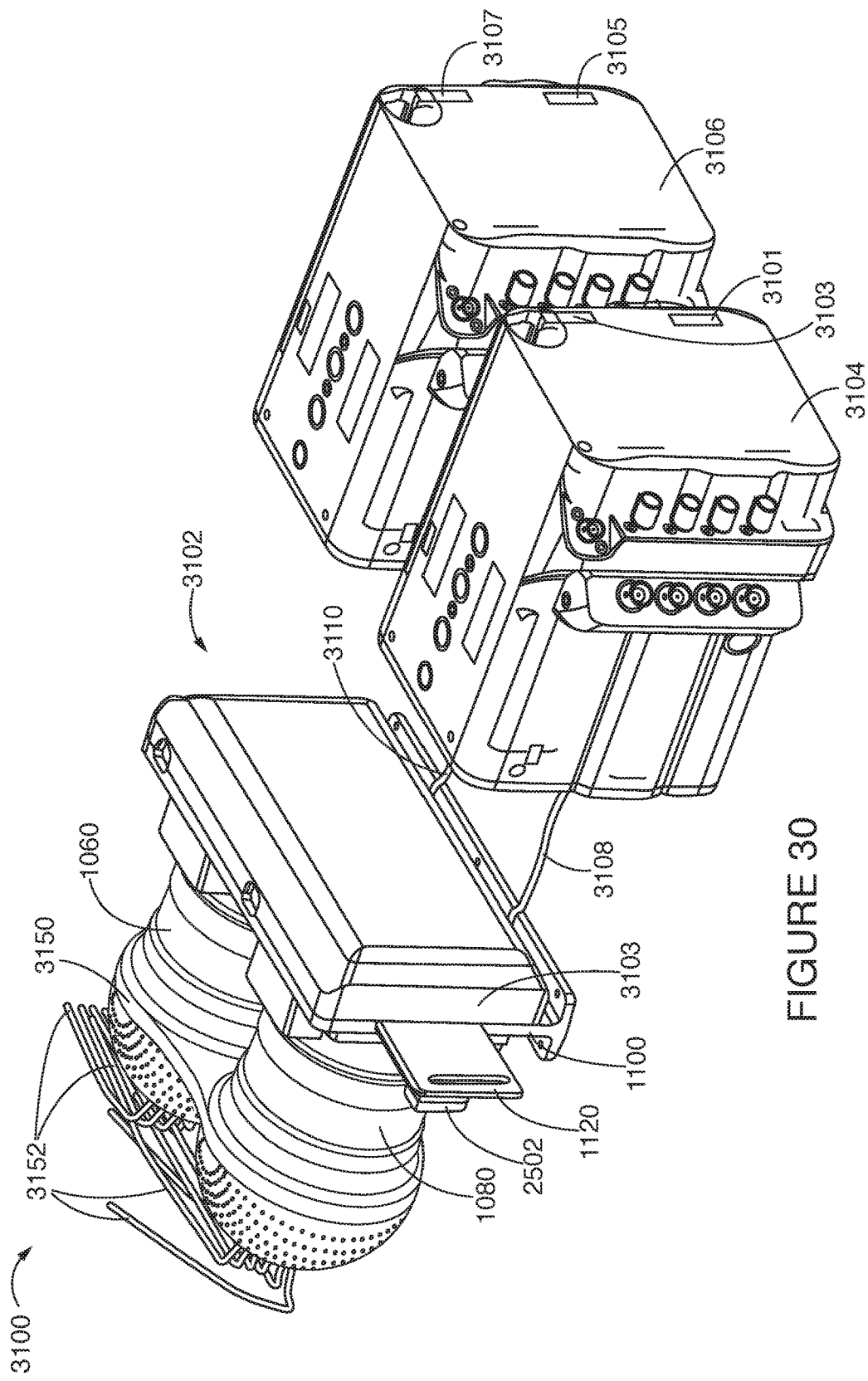
FIG. 30 illustrates an exemplary camera apparatus, e.g., a stereoscopic camera apparatus, including a pair of camera devices, said camera apparatus including a dual element mounting plate, a sensor holder assembly including a first sensor holder and second sensor, a pair of remote camera bodies each remote camera body including a processor, and a pair of cables for coupling the sensors to the processors, in accordance with an exemplary embodiment.
Figure 31:
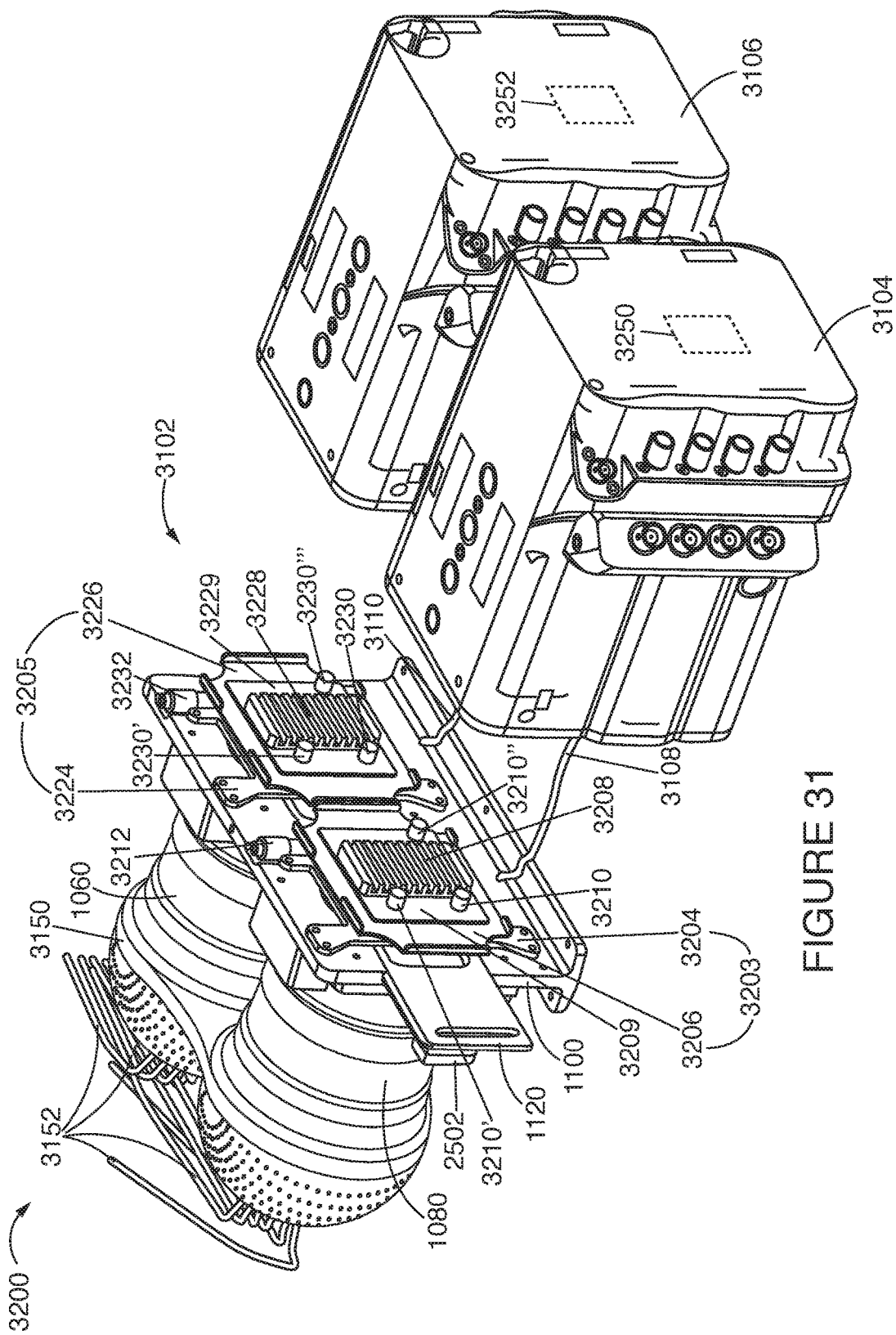
FIG. 31 illustrates the exemplary camera apparatus of FIG. 30, with the sensor holder cover removed, to further illustrate image sensor mounting.

FIG. 30 illustrates an exemplary camera apparatus 3100, e.g., a stereoscopic camera apparatus, including a pair of camera devices, said camera apparatus 3100 including a left eye lens mounting collar assembly 1080 and a right eye lens mounting collar assembly 1060, a dual element mounting plate 1100, a slideable filter plate 1120, solenoid 2502, a sensor holder assembly 3102 including a first sensor holder 3203 and second sensor 3205, a pair of remote camera bodies (3104, 3106) each remote camera body (3104, 3106) including a processor (3250, 3252), and a pair of cables (3108, 3110) for coupling the image sensors (3208, 3228) mounted on the sensor holders (3203, 3205) to the processors (3250, 3252), respectively, in the remote camera bodies (3104, 3106), in accordance with an exemplary embodiment. Sensor holder assembly cover 3103 covers the first and second sensor holders (3203, 3205), first and second sensor boards (3209, 3229), and first and second sensors (3208, 3228). The sensor holders (3203, 3205), sensor circuit boards (3208, 3209), image sensors (3208, 3228) and processors (3250, 3252) are not visible in FIG. 30 but are shown in FIG. 31. A first image sensor 3208, mounted on a first sensor circuit board 3209, mounted on a first sensor holder 3203, corresponding to lens mounting collar assembly 1080, is coupled to a first processor 3250 included in remote camera body 3104 via cable 3108. A second image sensor 3228, mounted on a second sensor circuit board 3229, mounted on a second sensor holder 3205, corresponding to lens mounting collar assembly 1060, is coupled to a second processor 3252 included in remote camera body 3106 via cable 3110.

In FIG. 30, calibration camera bra 3150 is shown placed over the lens assemblies. Camera bra 3150 includes a plurality of fiber optic cables 3152, which provide different light signals to different points on the lenses. Camera bra 3150 is a camera alignment tool. The camera bra 3150 can be secured by friction over the lenses of the stereoscopic camera pair shown with the inside surface of each dome of the bra 3150 providing the camera with a view of a test pattern which may be formed by an array of fiber optic light points, one corresponding to each hole in the camera bra. Light can be, in some embodiments is, connected to the holes in the camera bra shown by optical fibers 3152 which supply a point of light to the inside surface of the camera bra 3150 corresponding to the location of a hole. The points of light form a test pattern on the inside surface of the half sphere which is detected and used to facilitate camera alignment.

FIG. 31 is a drawing 3200 illustrating the exemplary camera apparatus 3100 of FIG. 30 with the sensor assembly cover plate 3103 removed in accordance with an exemplary embodiment. First sensor holder 3203 includes a front portion 3204, e.g., a lens side portion which mounts the first sensor holder 3203 to the dual element mounting plate 1100, and a rear portion 3206, e.g., a sensor side portion, to which the first sensor circuit board 3209 including the first image sensor 3208 is mounted via sensor board standoffs 3210, 3210', 3210". The first sensor mount 3203 also includes a first sensor position adjuster 3212, which can be moved, e.g., rotated, to cause the position of the first sensor 3208 to move in or out, either closer to or further away from the lens mounted in the lens assembly installed in lens mounting collar assembly 1080, e.g., to fine tune the distance between the lens and the first image sensor 3208. Second sensor holder 3205 includes a front portion 3224, e.g., a lens side portion which mounts the second sensor holder 3205 to the dual element mounting plate 1100, and a rear portion 3226, e.g., a sensor side portion, to which the second sensor circuit board 3229 including the second image sensor 3228 is mounted via sensor circuit board standoffs 3230, 3230', 3230". The second sensor mount 3205 also includes a second sensor position adjuster 3232, which can be moved, e.g., rotated, to cause the position of the second sensor circuit board 3229 including the second sensor 3228 to move in or out, either closer to or further away from the lens mounted in the lens assembly installed in lens mounting collar assembly 1060, e.g., e.g., to fine tune the distance between the lens and the second image sensor 3228.

Figure 32:
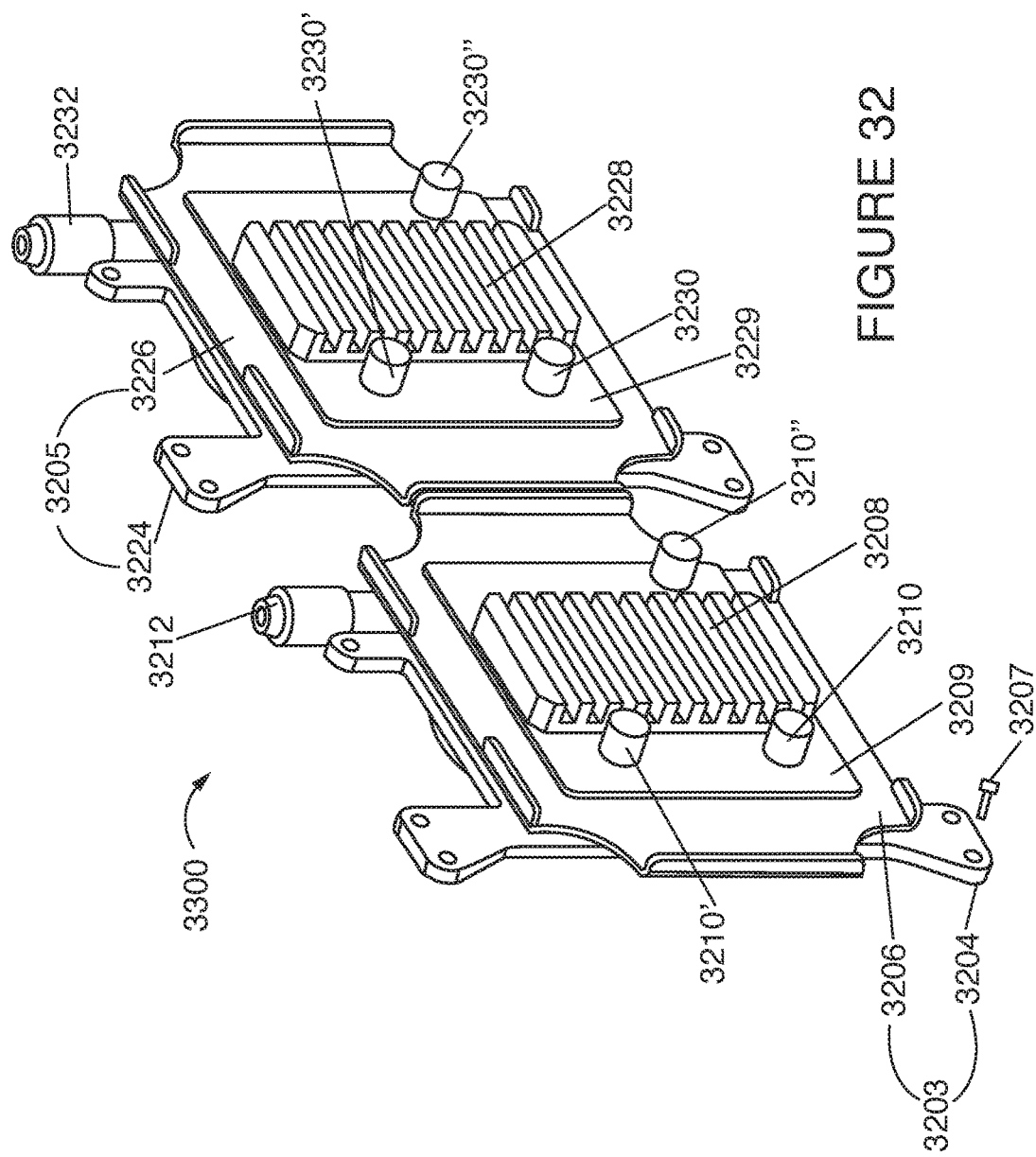
FIG. 32 illustrates first and second sensors mounted on first and second sensor mounts in the exemplary camera apparatus of FIG. 30.

FIG. 32 is a drawing 3300 illustrating a larger view of the exemplary pair of sensor holders (3203, 3205) including mounted sensors (3208, 3228), respectively, which was shown and previously described with respect to FIG. 31, in accordance with an exemplary embodiment. The sensor holders (3203, 3205) including mounted sensors may be included in a pair of camera bodies, e.g., camera bodies (103, 105) of camera device 100 of FIG. 1, or may be included in a sensor mounting assembly, e.g. sensor assembly 3102 of camera device 3100 of FIG. 30 and FIG. 31. In one embodiment, sensor holder 3203 and sensor 3208 are included in camera body 103 of camera device 102; and sensor holder 3205 and sensor 3228 are included in camera body 105 of camera device 104. FIG. 32 also illustrates an exemplary screw 3207 used for mounting the sensor holders (3203, 3205) to the dual element mounting plate 1100.

FIG. 33 is a drawing 3400 illustrating a view of the exemplary sensor holders (3203, 3205) from lens side. Sensor holder portion 3204 of sensor holder 3203 includes pass through screw holes (3203, 3203', 3203", 3203''') via which screws 3207 may be inserted to secure the sensor holder 3203 to a first portion 1151 of the dual element mounting plate 1100. Sensor holder portion 3224 of sensor holder 3205 includes pass through screw holes (3223, 3223', 3223", 3223''') via which screws 3207 may be inserted to secure the sensor holder 3205 to a second portion 1153 of the dual element mounting plate. Sensor holder 3203 includes a collar portion 3302. Sensor holder 3205 includes a collar portion 3304. In various embodiments, the pass through screw holes (3203, 3203', 3203", 3203''') are slightly larger than the screws 3207 to allow adjustment of the sensor holder position 3204 and thus sensor 3208 position before securing the screws 3207. In various embodiments, the pass through screw holes (3223, 3223', 3223", 3223''') are slightly larger than the screws 3207 to allow adjustment of the sensor holder 3205 position and thus sensor 3228 position before securing the screws 3207.

FIG. 34 is another drawing of the exemplary dual element mounting plate 1100. Three mounting screw holes (2220, 2220', 2220") are visible in the small center flat area 2202 of the base 2200. Mounting screws (3439, 3439', 3439") pass through pass through holes, e.g., holes (1504, 1504', 1504"), in the support plate 1500 and enter, e.g., are screwed into, the mounting screw holes (2220, 2220', 2220") in the dual element mounting plate 1100 securing the dual element mounting plate 1100 to the support plate 1500. In this exemplary embodiment, there are 3 mounting screws holes per dual element mounting, for securing the dual element mounting plate 1100 to a support base plate, e.g., support plate 1500. In other embodiments, a different number of mounting screw holes may be used. Threaded tilt adjustment screw holes (2221, 2221', 2221") are shown in the tapered portion 2205 of base 2200. Threaded tilt adjustment screw holes (2221', 2221"", 2221""") are shown in the tapered portion 2204 of base 2200. In some embodiment, the adjustment screw holes (2221, 2221', 2221", 2221''', 2221"", 2221""") are angled screw holes. For example, in some embodiments, the center of the top of adjustment screw hole 2221 is closer to the vertical center of dual element mounting plate 1100 than the center of the bottom (base side) of adjustment screw hole 2221 is to the vertical center of the dual element mounting plate 1100. This slight angling of adjustment screw holes (2221, 2221', 2221", 2221''', 2221"", 2221""") enhances stability and makes it easier to fine tune the verticality adjustment of the dual element mounting plate with respect to the base plate 1500.

Threaded screw holes (3403, 3403', 3403", 3403''') in dual element mounting plate 1100 correspond to holes (3303, 3303', 3303", 3303''') in front portion 3204 of first sensor holder 3203. Threaded screw holes (3403, 3403', 3403", 3403''') receive screws 3207 used to secure the first sensor holder 3203 to the first portion 1151 of the dual element mounting plate 1100. Threaded screw holes (3423, 3423', 3423", 3423''') in dual element mounting plate 1100 correspond to holes (3303, 3303', 3303", 3303''') in front portion 3224 of second sensor holder 3205. Threaded screw holes (3403, 3403', 3403", 3403''') receive screws 3207 used to secure the second sensor holder 3205 to the second portion 1153 of the dual element mounting plate 1100. Threaded screw holes (902, 902', 902", 902''') in dual element mounting plate 1100 correspond to spacer bushings (120, 120', 120", 120''') installed into the collar assembly 1080. Threaded screw holes (902, 902', 902", 902''') receive screws (135, 135', 135", 135''') and are used to secure the first collar assembly 1080 to the first portion 1151 of the dual element mounting plate 1100. Threaded screw holes (922, 922', 922", 922''') in dual element mounting plate 1100 correspond to spacer bushings (122, 122', 122", 122''') installed into the collar assembly 1060. Threaded screw holes (922, 922', 922", 922''') receive screws (137, 137', 137", 137''') and are used to secure the second collar assembly 1060 to the second portion 1153 of the dual element mounting plate 1100.

FIG. 34 further illustrates a solenoid mounting portion 2225 of the dual element mounting plate 1100, as well as threaded screw holes 2227, 2229 for accepting screws used to secure the solenoid 2502 to the dual element mounting plate 1110.

FIG. 34 illustrates that dual element mounting plate 1100 includes a first portion 1151 and a second portion 1153. The first sensor holder 3203 is secured to the first portion 1151 of the dual element mounting plate 1110. The second sensor holder 3205 is secured to the second portion 1153 of the dual element mounting plate 1110. In FIG. 34, the dual element mounting plate is shown on its side with the lens collar mounting side facing up and the sensor holder mounting side facing down; therefore, the first sensor holder 3203 is mounted beneath the dual element mounting plate 1100 to the portion identified by 1151, and the second sensor holder 3205 is mounted beneath the dual element mounting plate 1100 to the portion identified by 1153.

In some embodiments, dual element mounting plate 1100 includes a first flat recessed surface, e.g., similar to flat recess surface 181 of dual element mounting plate 110, corresponding to the first individual lens mount 1080; and the dual element mounting plate 1100 includes a second flat recessed surface, e.g., similar to flat recess surface 182 of dual element mounting plate 110, corresponding to the second individual lens mount 1060, and the first and second flat recessed surfaces are surrounded by a lip (191), e.g. similar to lip 191 of dual element mounting plate 110, which at least partially protects the first individual lens mount 1080 and second individual lens mount 1060 from side impacts when the first and second individual lens mounts (1080, 1060) are secured to the dual element mounting plate 1100.

In some embodiments, an exemplary camera system, e.g., a stereoscopic camera system, in accordance with an exemplary embodiment, includes one or more camera apparatus, e.g., one two, three or four camera apparatus, e.g., camera apparatus 100 or camera apparatus 3100, each camera apparatus including a dual element mounting plate, e.g., 110 or 1100, and the camera system further includes a support plate, e.g., 1500, to which multiple dual element mounting plates may be secured. In addition in some embodiments, the camera system further includes a top support plate, e.g., 2042 and handles, e.g., 2040, 2040', 2040'', 2040'''.

While various features such as camera mounts, filter mounts, a camera support plate, etc. are described in the context of particular exemplary embodiments, the cameras, mounts, etc. can be used in a wide variety of combinations and are not to be limited to the particular combination of the exemplary embodiments. For example, the filter mounts can be used with any of the cameras described in the present application and/or numerous other cameras.

What is claimed is:

1. A camera apparatus comprising:
   a dual element mounting plate including a slot; and
   a slideable filter plate, including a plurality of pairs of filter mounting positions, said slideable filter plate being positioned in the slot in the dual element mounting plate, and
   wherein the plurality of pairs of filter mounting positions includes:
      a first pair of filter mounting positions including a first right camera filter mounting position and a first left camera filter mounting position; and
      a second pair of filter mounting positions including a second right camera filter mounting position and a second left camera filter mounting position, a center of the first left camera filter mounting position being separated from the center of the first right camera filter mounting position by a distance corresponding to the distance between a center of a left eye lens opening and a center of a right eye lens opening in said dual element mounting plate, a distance between the first left camera filter mounting position and the second left camera filter mounting position being less than the distance between the center of the left eye lens opening and the center of the right eye lens opening in said dual element mounting plate.

2. The camera apparatus of claim 1, wherein the slideable filter plate includes an upper lip and a lower lip.

3. The camera apparatus of claim 2,
   wherein said upper lip extends into an upper channel in the dual element mounting plate which forms a top portion of said slot; and
   wherein said lower lip extends into an lower channel in the dual element mounting plate which forms a bottom portion of said slot.

4. The camera apparatus of claim 3, wherein said upper and lower lips are located on a lens mounting side of said dual element mounting plate and block light entry into a left sensor holder and a right sensor holder secured to a sensor holder mounting side of said dual element mounting plate.

5. The camera apparatus of claim 4, wherein said dual element mounting plate includes a base.

6. The camera apparatus of claim 5, wherein the base includes a curved or tapered bottom portion.

7. The camera apparatus of claim 5, wherein the base includes one or more mounting holes through which at least one screw is inserted to secure the dual element mounting plate to a support plate to which multiple dual element mounting plates can be secured.

8. The camera apparatus of claim 7, wherein the base further includes one or more angled threaded holes which extend through the base through which at least one screw is inserted to apply pressure to the support plate to which the dual element mounting plate is secured, the distance to which the screw or screws are inserted into the threaded hole or holes controlling the vertical orientation of the dual element mounting plate relative to the support plate.

9. The camera apparatus of claim 8, further comprising:
   a first individual lens mount secured to the lens mounting side of the dual element mounting plate; and
   a second individual lens mount secured to the lens mounting side of the dual element mounting plate.

10. The camera apparatus of claim 9, further comprising:
    a first plurality of spacer bushings inserted into the first individual lens mount for controlling spacing between corners of said first individual lens mount and a surface of said dual element mounting plate.

11. The camera apparatus of claim 10,
    wherein spacer bushings in said first plurality of spacer bushings are threaded bushings having threads on the outside of said spacer bushings; and
    wherein the first individual lens mount includes a threaded hole in each corner of said first individual lens mount.

12. The camera apparatus of claim 11, further comprising:
    a second plurality of spacer bushings inserted into the second individual lens mount for controlling spacing between corners of said second individual lens mount and the surface of said dual element mounting plate; and
    wherein spacer bushings in said second plurality of spacer bushings are threaded bushings having threads on the outside; and
    wherein the second individual lens mount includes a threaded hole in each corner of said second individual lens mount.

\* \* \* \* \*